(12) United States Patent
Kikuma

(10) Patent No.: US 7,035,670 B2
(45) Date of Patent: Apr. 25, 2006

(54) CELLULAR PHONE SYSTEM AND MOBILE COMMUNICATION TERMINALS AND BASE STATION CONTROLLING APPARATUS IN THE SYSTEM AND METHOD CHANGING OVER TO DIFFERENT FREQUENCY IN THE SYSTEM

(75) Inventor: Tomohiro Kikuma, Tokyo (JP)

(73) Assignee: NEC Corporation, Tokyo (JP)

( * ) Notice: Subject to any disclaimer, the term of this patent is extended or adjusted under 35 U.S.C. 154(b) by 485 days.

(21) Appl. No.: 10/442,140

(22) Filed: May 21, 2003

(65) Prior Publication Data

US 2003/0220079 A1 Nov. 27, 2003

(30) Foreign Application Priority Data

May 22, 2002 (JP) ............................. 2002-147079

(51) Int. Cl.
*H04B 1/38* (2006.01)
*H04M 1/00* (2006.01)

(52) U.S. Cl. ................ 455/561; 455/67.11; 455/67.13; 455/436; 455/441; 455/442; 455/524; 455/450; 455/63.1; 455/522; 455/509; 370/331; 370/332; 370/333; 370/330; 370/342

(58) Field of Classification Search ............. 455/67.11, 455/67.13, 63.1, 62, 522, 436, 437, 441, 455/442, 450, 525, 464, 561, 524
See application file for complete search history.

(56) References Cited

U.S. PATENT DOCUMENTS

| | | | |
|---|---|---|---|
| 5,408,514 A * | 4/1995 | Sakamoto et al. | 455/436 |
| 5,914,947 A * | 6/1999 | Saito | 370/337 |
| 5,920,819 A * | 7/1999 | Asanuma | 455/447 |
| 5,963,865 A * | 10/1999 | Desgagne et al. | 455/450 |
| 5,991,282 A * | 11/1999 | Langlet et al. | 370/332 |
| 6,128,513 A * | 10/2000 | Faerber | 455/561 |
| 6,219,561 B1 * | 4/2001 | Raleigh | 455/561 |
| 6,603,971 B1 * | 8/2003 | Mohebbi | 455/437 |
| 6,658,252 B1 * | 12/2003 | Mohebbi | 455/437 |

* cited by examiner

*Primary Examiner*—Marceau Milord
(74) *Attorney, Agent, or Firm*—McGinn IP Law Group, PLLC

(57) ABSTRACT

A cellular phone system, in which the probability that the deterioration of channel quality and the phenomenon of a call drop occur caused by the imperfection of the control of the changing over to the different frequency can be lowered and the channel quality can be made to be higher, is provided. A first base station communicates with a mobile communication terminal by using a first frequency, and a second base station communicates with the mobile communication terminal by using a second frequency. And while the mobile communication terminal is communicating with the first base station by using a channel, the reception quality of the second frequency is measured corresponding to the change of the quality of the channel, and the channel is changed over to the second base station corresponding to the measured reception quality and the change of the quality of the channel. And in case that the quality of the channel is within a predetermined first range and when the change of the quality of the channel is larger than a designated value, the reception quality of the second frequency is measured at the mobile communication terminal. And in case that the quality of the channel is without the predetermined first range, the reception quality of the second frequency is measured more frequently at the mobile communication terminal, compared with the case that the quality of the channel is within the predetermined first range.

24 Claims, 20 Drawing Sheets

F I G. 13
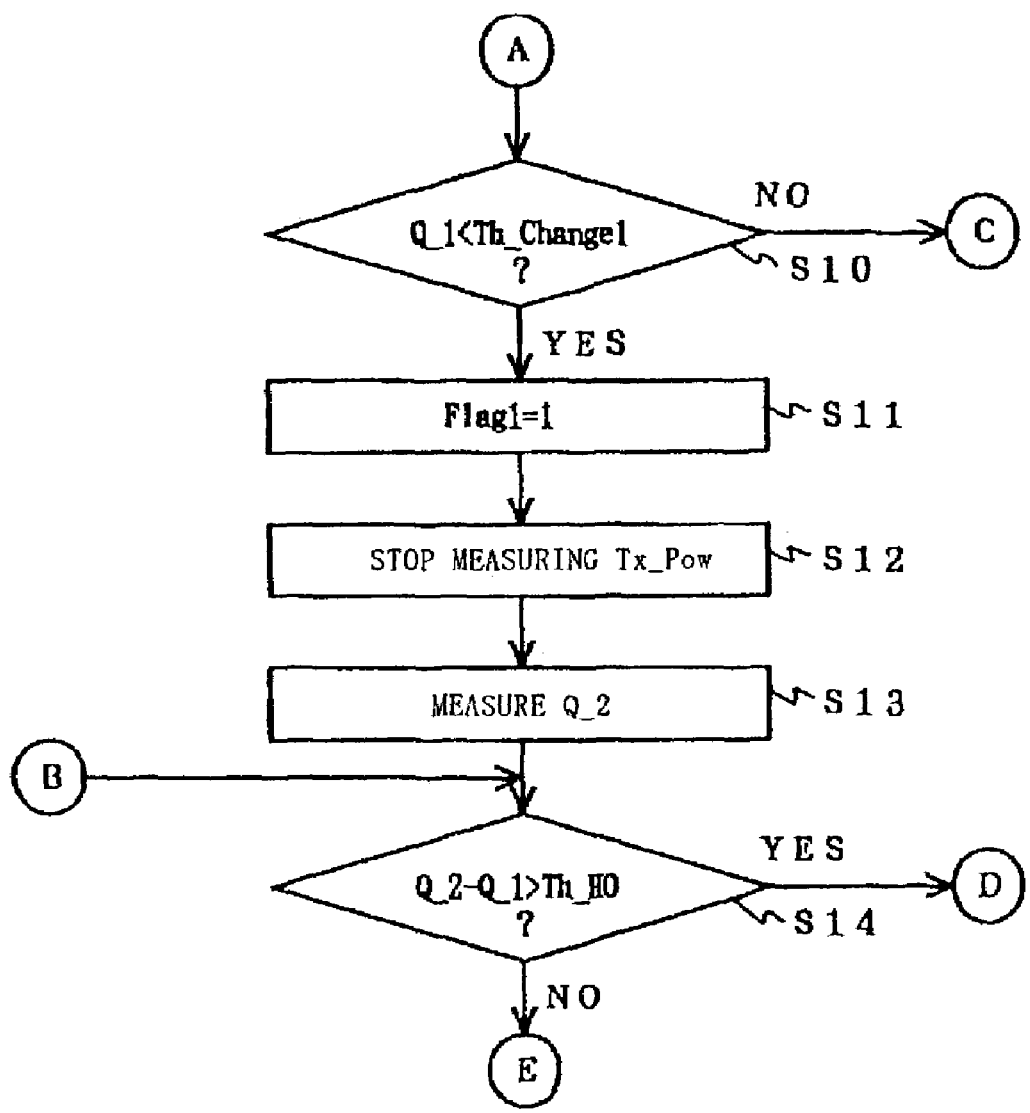

F I G. 14
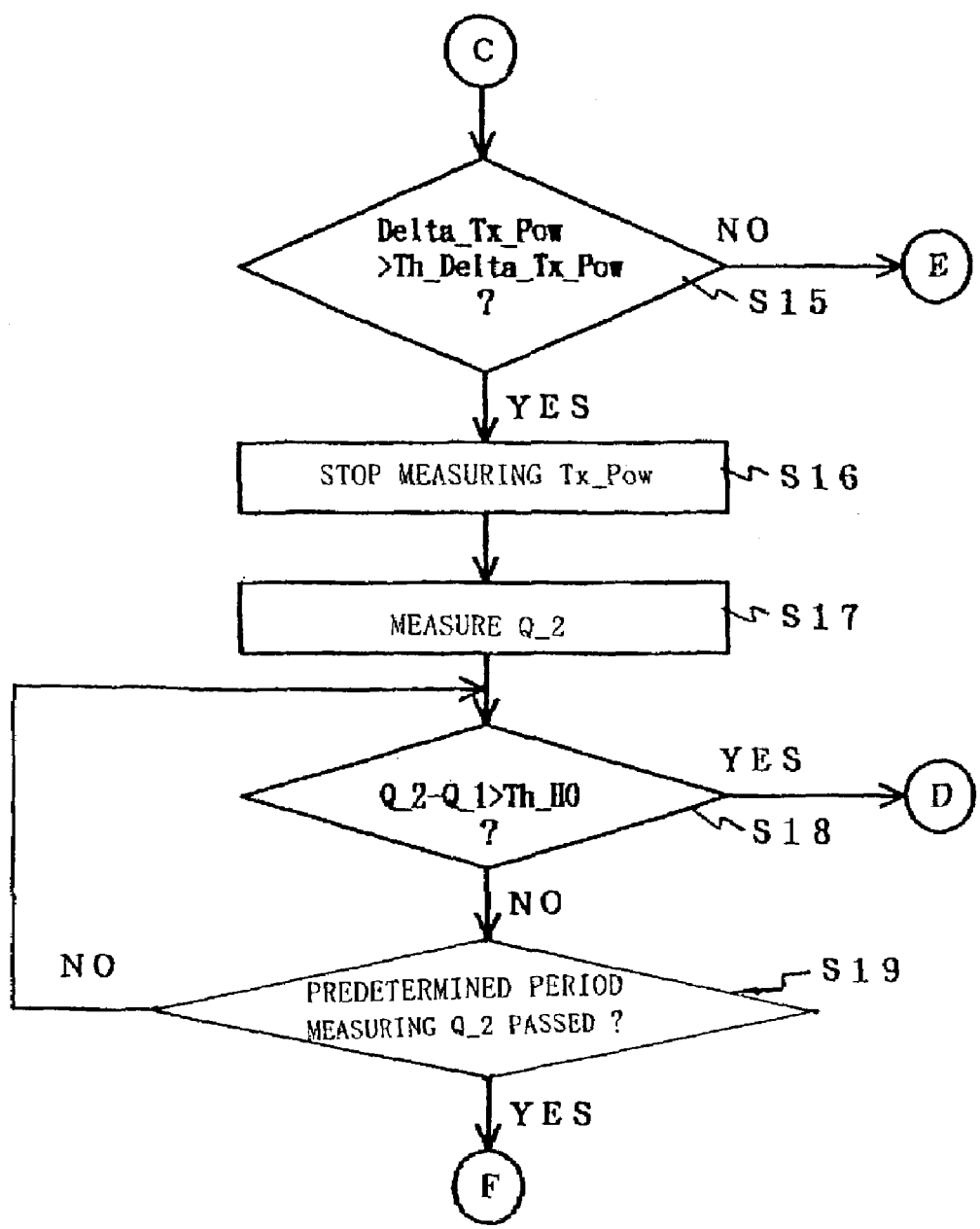

F I G. 17
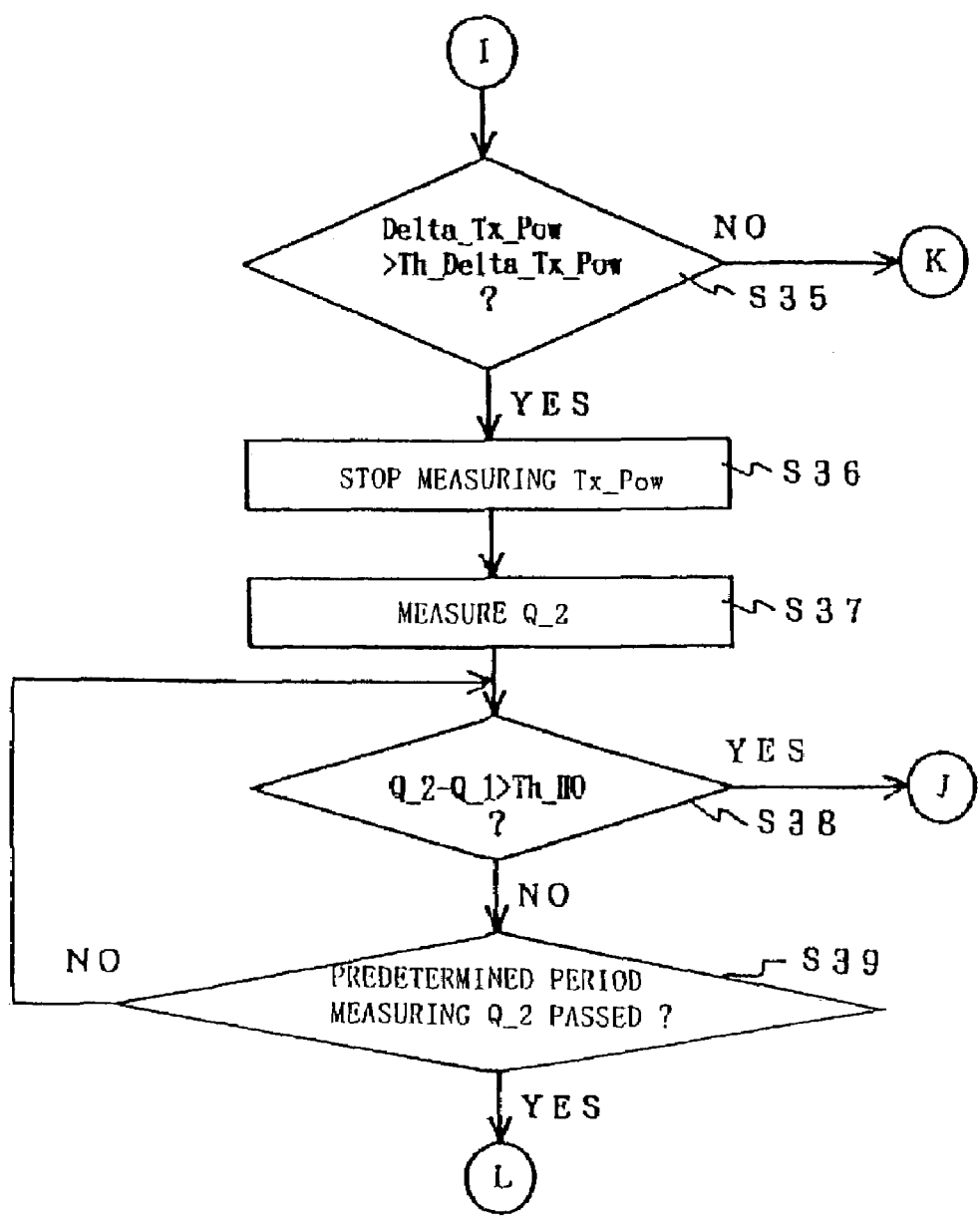

CELLULAR PHONE SYSTEM AND MOBILE COMMUNICATION TERMINALS AND BASE STATION CONTROLLING APPARATUS IN THE SYSTEM AND METHOD CHANGING OVER TO DIFFERENT FREQUENCY IN THE SYSTEM

BACKGROUND OF THE INVENTION

The present invention relates to a cellular phone system and mobile communication terminals in the system and a base station controlling apparatus in the system and a method changing over to a different frequency in the system.

DESCRIPTION OF THE RELATED ART

At a cellular phone system using a CDMA (code division multiple access) system, in order to increase the capacity of channels, its transmission power is controlled. Generally, the transmission power is controlled by using a value of SIR (signal to interference power ratio) showing in the following equation (1).

$$SIR=S/(I+N) \qquad (1)$$

In this, the S signifies desiring wave signal power, the I signifies interference power per band, and the N signifies noise per band.

At the control of the transmission power, the reception side measures the reception SIR shown in the equation (1). When the measured result is smaller than a target SIR, the reception side requires the transmission side to increase the transmission power, and when the measured result is larger than the target SIR, the reception side requires the transmission side to decrease the transmission power. With this, its channel quality can be controlled in a certain value and the capacity of channels can be increased.

Further, at the cellular phone system using the CDMA system, in case that plural frequencies are allocated, a technology, which changes over its carrier frequency to a different carrier frequency, is important.

Generally, in order to increase the frequency utilization efficiency, the technology changing over to the different frequency has a purpose that a call drop phenomenon caused by the deterioration of the channel quality in the currently using carrier frequency is avoided.

First, the technology changing over to the different frequency is explained in the viewpoint of the system structure. In the explanation of prior arts, drawings showing in FIGS. 1 to 6, which are the drawings at embodiments of the present invention, are used.

In FIG. 1, the structure of a cellular phone system, in which two carrier frequencies are used in one service area, is shown. In FIG. 2, the positions of the carrier frequencies in the upstream channel and the downstream channel are shown.

In FIG. 1, a mobile communication terminal 30 can connect its channel to any of base stations 10, 11, 20, and 21. The carrier frequency, which the mobile communication terminal 30 uses in the channel with the base stations 10 and 11, is a carrier frequency 101 at the upstream channel and a carrier frequency 103 at the downstream channel shown in FIG. 2. And the carrier frequency, which the mobile communication terminal 30 uses in the channel with the base stations 20 and 21, is a carrier frequency 102 at the upstream channel and a carrier frequency 104 at the downstream channel shown in FIG. 2. And the control changing over to the different frequency, whether the mobile communication terminal 30 connects to the base stations 10 and 11 or the base stations 20 and 21 during its communication, is controlled by the mobile communication terminal 30 or a base station controlling apparatus 60.

Next, a control method changing over to a different frequency is explained. In FIG. 1, it is assumed that the channel of the mobile communication terminal 30 has been connected to the base station 10 as an initial state. At this time, at the downstream channel of the mobile communication terminal 30, the currently using carrier frequency is 103, and the carrier frequency to which the carrier frequency is changed over is 104. And at the upstream channel, the currently using carrier frequency is 101, and the carrier frequency to which the carrier frequency is changed over is 102.

At this time, the mobile communication terminal 30 measures the reception quality $Q\_1$ at the broadcast channel of the currently using carrier frequency 103 and the reception quality $Q\_2$ at the broadcast channel of the carrier frequency 104 to which the carrier frequency is changed over being the different frequency, and compares the measured results. And at the time when the difference between the reception quality $Q\_1$ and $Q\_2$ satisfies the following condition, the changing over to the different frequency is executed.

The changing over to the different frequency signifies that the carrier frequency using currently is changed over to a different frequency. In this case, at the downstream channel, the carrier frequency is changed over from the carrier frequency 103 to the carrier frequency 104, and at the upstream channel, the carrier frequency is changed over from the carrier frequency 101 to the carrier frequency 102.

At the inequality showing in (2), $$Q\_2 - Q\_1 > Th\_HO \qquad (2)$$

the Th_HO signifies a judging threshold value at the control of changing over to a different frequency, and the value of the Th_HO is positive. Generally, at the inequality (2), the smaller the value of the Th_HO is, the smaller the probability generating a call drop becomes. However, the load controlling the changing over to the different frequency is increased when the value of the Th_HO is set to be small. Therefore, an optimum value is set as the value of the Th_HO.

Generally, at the cellular phone system using plural carrier frequencies, the mobile communication terminal in the system uses one oscillator from the viewpoint of low power consumption, and the oscillating frequency of the oscillator is changed, when it is needed. Under this structure of the mobile communication terminal, when the reception quality of the carrier frequency to which the carrier frequency is changed over, is measured, there is a following problem due to the one oscillator. That is, the mobile communication terminal cannot receive data from the currently using carrier frequency while the mobile communication terminal is measuring the reception quality of the carrier frequency to which the carrier frequency is changed over.

Therefore, at the system, it is necessary that its transmitting waveform has been formed, at the state that data vacant time for measuring the reception quality of the carrier frequency to which the carrier frequency is changed over is kept beforehand. In case that the communication speed is a constant, in order to make the data vacant time, a data compression technology, by which the data vacant time is made, is required.

Generally, at the data compression technology, the transmission data are compressed in the time by using a method lowering its diffusion rate or a method making its coding rate higher by that a part of coded data is not transmitted. At the data compression technology, when it is compared with a case in which the data compression technology is not used, the error correction ability at the reception is deteriorated, and the utilization efficiency of frequency is lowered. Therefore, it is not desirable that the ratio of the data vacant time to the communication time becomes high. Hereinafter, the ratio of the data vacant time to the communication time is referred to as the ratio of the data vacant time.

As mentioned above, at the time of measuring the different frequency, it is desirable that the timing of changing over to the different frequency is judged accurately in a low ratio of the data vacant time. In order to lower the ratio of the data vacant time, the following improved control methods are used in the conventional technologies.

In FIG. 3, at the downstream channel for the mobile communication terminal 30, the waveform of the reception quality Q_1 of the broadcast channel at the currently using carrier frequency and the waveform of the reception quality Q_2 of the broadcast channel at the carrier frequency to which the carrier frequency is changed over are shown.

Referring to FIG. 3, a first conventional improved control method is explained. In the first conventional improved control method, the range of measuring the different frequency is limited. In FIG. 3, in order to decrease the data vacant time at the time when the different frequency is measured, the mobile communication terminal 30 starts to measure the different frequency at the time t1 or t3, when the reception quality Q_1 of the broadcast channel at the currently using carrier frequency satisfies the following inequality (3).

$$Q\_1 < Th\_start \quad (3)$$

After this, the mobile communication terminal 30 ends the measurement of the different frequency at the time t2, when the reception quality Q_1 of the broadcast channel at the currently using carrier frequency satisfied the following inequality (4). Or the mobile communication terminal 30 ends the measurement of the different frequency at the time t4, when the inequality (2) was satisfied, at the same time the control of the changing over to the different frequency is started.

$$Q\_1 > Th\_end \quad (4)$$

In this case, the judging threshold values Th_start and Th_end in the inequalities (3) and (4) are desirable to have a margin satisfying the following inequality (5).

$$Th\_end - Th\_start > 0 \quad (5)$$

In the inequality (5), the larger the difference between the Th_end and Th_start is, the larger the margin becomes. By the concept mentioned above, the range of measuring the different frequency is limited by using the judging threshold values Th_start and Th_end. With this, when it is compared with that range of measuring the different frequency is not limited, the ratio of the data vacant time can be decreased.

In a second conventional improved control method, the measurement of the different frequency is executed by detecting the change of the transmission power in an individual channel. At the second conventional improved control method, the ratio of the data vacant time can be decreased more than that at the first conventional improved control method. At the second conventional improved control method, the measurement of the different frequency is started or stopped by using the detected results of the change of the transmission power in the individual channel.

This second conventional improved control method is explained in detail. When the reception quality Q_1 of the broadcast channel of the currently using carrier frequency at the mobile communication terminal 30 is within the range of measuring the different frequency at the first conventional improved control method, the base station controlling apparatus 60 measures the change of the transmission power Delta_Tx_Pow of an individual channel to the mobile communication terminal 30 from a base station connecting to the mobile communication terminal 30. And the measurement of the different frequency is started at the time when the following inequality (6), in which the change of the transmission power Delta_Tx_Pow of the individual channel is larger than a judging threshold value Th_Delta_Tx_Pow, was satisfied, and the measurement of the different frequency is executed for a predetermined period.

$$Delta\_Tx\_Pow > Th\_Delta\_Tx\_Pow \quad (6)$$

In this, the change of the transmission power Delta_Tx_Pow of the individual channel is the difference of the transmission power Tx_Pow of the individual channel between the time t_a and t_b (t_b−t_a>0).

The inequality (6) mentioned above has the same basic concept that the following inequality (7) has.

$$Delta\_Tx\_Pow < Th\_Delta\_Tx\_Pow \quad (7)$$

That is, the measurement of the different frequency is not started at the time when the inequality (7), in which the change of the transmission power Delta_Tx_Pow of an individual channel is smaller than the judging threshold value Th_Delta_Tx_Pow, was satisfied, and the measurement of the different frequency is not executed for a predetermined period.

Next, the qualitative explanation about the effectiveness of the conventional first and second improved methods is executed. As mentioned above, at the cellular phone system using the CDMA system, the transmission power is controlled in the individual channel. At the downstream channel, the mobile communication terminal measures the SIR shown in the equation (1) of the signal transmitted from the base station. When this measured reception SIR is smaller than a target SIR, the mobile communication terminal requests the base station to increase the transmission power. And when this measured reception SIR is larger than the target SIR, the mobile communication terminal requests the base station to decrease the transmission power. With this operation, the capacity of the channels is increased.

The cause of the deterioration of the reception SIR is either case that the desiring wave signal power S in the numerator of the equation (1) was lowered, or that the (I+N) in the denominator of the equation (1), which the sum of the interference power I per band and the noise power N per band, was made to higher.

Moreover, as the cause of the decrease of the reception SIR, it can be considered that the desiring wave signal power S was lowered by that the propagation loss between the base station and the mobile communication terminal was increased in a situation that the decrease of the desiring wave signal power S being the numerator of the equation (1) has been dominant.

Further, as the cause of the decrease of the reception SIR, it can be considered that the cause of the increase of the (I+N) of the denominator of the equation (1) is a case that the interference power per band I was increased, when the noise power per band N is assumed to be a constant, in a situation that the increase of the (I+N) has been dominant.

From the explanation mentioned above, as the cause of the decrease of the reception SIR in the equation (1), two cases can be considered. That is, one case is that the propagation loss between the base station and the mobile communication terminal was increased, and the other case is that the reception interference power at the mobile communication terminal was increased.

As mentioned above, at the downstream channel, the increase of the transmission power transmitting from the base station in the individual channel signifies that the reception SIR at the mobile communication terminal has been decreased. The cause can be considered that the propagation loss between the base station and the mobile communication terminal was increased, or the reception interference power at the mobile communication terminal was increased.

By the reason mentioned above, in a case that the change of the transmission power of an individual channel in a period T is large in the positive direction, it can be considered that the reception SIR at the mobile communication terminal in the period T was decreased. That is, it can be considered that the interference power was increased or the propagation loss was increased. By using the information of the change of the transmission power of the individual channel for the object to decrease the ratio of the data vacant time, the following advantages can be considered.

At the conventional first improved method, in case that the reception quality Q_1 of the broadcast channel of the currently using carrier frequency is within the range of the measurement of the different frequency, the measurement of the different frequency is continued. In this case, even when the reception quality Q_1 of the broadcast channel of the currently using carrier frequency at the current time has been improved, compared with the reception quality Q_1 at a past time, the measurement of the different frequency is continued if the reception quality Q_1 is within the range of the measurement of the different frequency.

The measurement of the different frequency in this case is not necessary, because the reception quality has been improved, compared with that at the past time. In order to decrease this unnecessary measuring time of the different frequency, the measurement of the different frequency is controlled by using the information of the change of the transmission power of the individual channel shown in the inequality (6). When the change of the transmission power of an individual channel at a period T has become positive, as its dominant cause, it can be generally considered that the reception quality of the broadcast channel has been deteriorated in case that the reception interference power at the mobile communication terminal has increased.

Therefore, the measurement of the different frequency is executed at the time only when the reception quality of the broadcast channel at the current time was deteriorated, compared with that at the past time. Consequently, the unnecessary measurement of the different frequency is not executed, and the ratio of the data vacant time is decreased.

Next, a case, in which a mobile communication terminal is within the range of the measurement of the different frequency and does not move, is assumed. In this case, the mobile communication terminal remains stationary, therefore, when the interference by another user is not increased, the reception quality of the broadcast channel becomes a constant. The measurement of the different frequency is not necessary in a state that the reception quality is a constant. Consequently, at only the conventional first improved method, although in a case that the reception quality does not change but the mobile communication terminal is within the range of the measurement of the different frequency, therefore the unnecessary measurement of the different frequency is continued, and the ratio of the data vacant time is increased.

Further, at the conventional second improved method, in case that the mobile communication terminal does not move, when the interference power at the mobile communication terminal is not increased, the change of the transmission power of the individual channel does not occur. Therefore, the unnecessary measurement of the different frequency is not executed at the state that the mobile communication terminal does not move. This is the qualitative explanation about the effectiveness of the conventional second improved method.

However, in order to decrease the ratio of the data vacant time, when the conventional second improved method is used, changing over to a different frequency is not executed at a time when the changing over to the different frequency should be essentially executed. Consequently, there is a possibility that a call drop occurs by this cause.

Referring to drawings, this problem is explained. In FIG. 4, a waveform in the passage of time of the transmission power of an individual channel at a downstream channel between the mobile communication terminal 30 and the base station 10 currently connecting to the mobile communication terminal 30 is shown. And in FIG. 5, waveforms in the passage of time of the reception quality Q_1 of the broadcast channel of the currently using carrier frequency and the reception quality Q_2 of the broadcast channel of the carrier frequency to which the carrier frequency is changed over at the downstream channel of the mobile communication terminal 30 are shown.

In FIG. 4, a state, in which the change of the transmission power Delta_Tx_Pow of the individual channel from the time t5 to t6 does not satisfy the inequality (6), is shown. And in FIG. 5, a state, in which the waveforms of the broadcast channels already satisfy the inequality (2) at the time t6, is shown.

And in FIG. 5, the judging threshold value Th_call drop signifies the minimum reception quality level, with which the mobile communication terminal 30 can communicate, and the mobile communication terminal 30 cannot communicate after the time t6 by using the currently using carrier frequency.

In case that the conventional second improved method is used, in FIGS. 4 and 5, at the time t6, the inequality (6) does not satisfy. Therefore, the measurement of the different frequency is not executed and changing over to the different frequency is not executed, consequently, there is a problem that the communication of the mobile communication terminal 30 is dropped.

Further, in order to decrease the ratio of the data vacant time, in case that the control method of changing over to the different frequency by the conventional second improved method is used, the changing over to the different frequency is not executed at the time when the changing over to the different frequency should be essentially executed. Therefore, there is a possibility that the call drop occurs by this cause.

Referring to FIG. 6, this problem is explained. In FIG. 6, a waveform in the passage of time of the transmission power of an individual channel at a downstream channel between the mobile communication terminal 30 and the base station 10 currently connecting to the mobile communication terminal 30 is shown. Generally, the change of the transmission power Delta_Tx_Pow in a period T is set to be an optimum value beforehand. In this case, in FIG. 6, the change of the transmission power Delta_Tx_Pow in the period T from the time t1 to t2 satisfies the inequality (6). Therefore, the measurement of the different frequency is executed.

On the contrary, in FIG. 6, the change of the transmission power Delta_Tx_Pow in the period T from the time t3 to t4 does not satisfy the inequality (6). Because, the transmission power of the individual channel to the mobile communication terminal 30 exceeded the maximum value of the transmission power Max_Tx_Pow.

In this case, the maximum value of the transmission power Max_Tx_Pow is limited. Therefore, at the time when the interference power was increased at the mobile communication terminal 30 or the mobile communication terminal 30 moved, the measurement of the different frequency is not executed, and there is a high possibility that the reception quality is deteriorated.

Further, in a case that the change of the transmission power Delta_Tx_Pow in the period T does not satisfy the inequality (6) but the waveform of the transmission power Tx_Pow gradually increases to the maximum value Max_Tx_Pow in the passage of time, although the interference power receiving at the mobile communication terminal 30 is increased, the measurement of the different frequency is not started. Therefore, there is a high possibility that the reception quality is deteriorated.

SUMMARY OF THE INVENTION

It is therefore an object of the present invention to provide a cellular phone system and mobile communication terminals in the system and a base station controlling apparatus in the system and a method changing over to a different frequency in the system, in which the probability that the deterioration of channel quality and the phenomenon of a call drop occur caused by the imperfection of the control of the changing over to the different frequency can be lowered and the channel quality can be made to be higher.

According to a first aspect of the present invention, for achieving the object mentioned above, there is provided a cellular phone system. The cellular phone system provides a mobile communication terminal, a first base station that communicates with the mobile communication terminal by using a first frequency, and a second base station that communicates with the mobile communication terminal by using a second frequency. And while the mobile communication terminal is communicating with the first base station by using a channel, the reception quality of the second frequency is measured corresponding to the change of the quality of the channel, and the channel is changed over to the second base station corresponding to the measured reception quality and the change of the quality of the channel. And the cellular phone system further provides a first reception quality measuring means that measures the reception quality of the second frequency at the mobile communication terminal in case that the quality of the channel is within a predetermined first range and when the change of the quality of the channel is larger than a designated value, and a second reception quality measuring means that measures more frequently the reception quality of the second frequency at the mobile communication terminal in case that the quality of the channel is without the predetermined first range, compared with the case that the quality of the channel is within the predetermined first range.

According to a second aspect of the present invention, in the first aspect, the first base station transmits a broadcast channel, and the quality of the channel is the reception quality of the broadcast channel at the mobile communication terminal.

According to a third aspect of the present invention, in the first aspect, the first base station controls the transmission power of the channel corresponding to the reception quality of the channel at the mobile communication terminal, and the quality of the channel is the size of the transmission power.

According to a fourth aspect of the present invention, in the first aspect, the mobile communication terminal controls the transmission power of the channel at the first base station corresponding to the reception quality of the channel, and the quality of the channel is the size of the transmission power.

According to a fifth aspect of the present invention, in the first aspect, in case that the quality of the channel is without the predetermined first range, regardless of the size of the change of the quality of the channel, the reception quality of the second frequency is measured at the mobile communication terminal.

According to a sixth aspect of the present invention, in the first aspect, the first base station transmits data by compressing the data in the time and also makes a data vacant time in which data is not transmitted, and the mobile communication terminal measures the reception quality of the second frequency in the data vacant time.

According to a seventh aspect of the present invention, for achieving the object mentioned above, there is provided a mobile communication terminal, which communicates with a first base station by using a first frequency and communicates with a second base station by using a second frequency and measures the reception quality of the second frequency corresponding to the change of the quality of a channel while communication is executing with the first base station by using the channel, and which changes over the channel to the second base station corresponding to the measured reception quality and the change of the quality of the channel. The mobile communication terminal provides a first reception quality measuring means that measures the reception quality of the second frequency in case that the quality of the channel is within a predetermined first range and when the change of the quality of the channel is larger than a designated value, and a second reception quality measuring means that measures more frequently the reception quality of the second frequency in case that the quality of the channel is without the predetermined first range, compared with the case that the quality of the channel is within the predetermined first range.

According to an eighth aspect of the present invention, in the seventh aspect, the quality of the channel is the reception quality of a broadcast channel transmitting from the first base station.

According to a ninth aspect of the present invention, in the seventh aspect, the quality of the channel is the size of the transmission power of the channel that is controlled at the first base station corresponding to the reception quality of the channel at its own mobile communication terminal.

According to a tenth aspect of the present invention, in the seventh aspect, the quality of the channel is the size of the transmission power of the channel that is controlled at its own mobile communication terminal corresponding to the reception quality at the first base station.

According to an eleventh aspect of the present invention, in the seventh aspect, in case that the quality of the channel is without the predetermined first range, regardless of the size of the change of the quality of the channel, the reception quality of the second at its own mobile communication terminal frequency is measured.

According to a twelfth aspect of the present invention, in the seventh aspect, the reception quality of the second frequency is measured in a data vacant time, which is made by the first base station by compressing transmitting data in the time and is a time in which data is not transmitted.

According to a thirteenth aspect of the present invention, for achieving the object mentioned above, there is provided a base station controlling apparatus in a cellular phone system. And the cellular phone system provides a mobile communication terminal, a first base station that communicates with the mobile communication terminal by using a first frequency, and a second base station that communicates with the mobile communication terminal by using a second frequency. And while the mobile communication terminal is communicating with the first base station by using a channel, the reception quality of the second frequency is measured corresponding to the change of the quality of the channel, and the channel is changed over to the second base station corresponding to the measured reception quality and the change of the quality of the channel. And the base station controlling apparatus controls the first and second base stations. And the base station controlling apparatus provides a reception quality measuring means that measures the reception quality of the second frequency at the mobile communication terminal in case that the quality of the channel is within a predetermined first range and when the change of the quality of the channel is larger than a designated value, and an instructing means that instructs one of the first and second base stations and the mobile communication terminal to measure more frequently the reception quality of the second frequency at the mobile communication terminal in case that the quality of the channel is without the predetermined first range, compared with the case that the quality of the channel is within the predetermined first range.

According to a fourteenth aspect of the present invention, in the thirteenth aspect, the first base station transmits a broadcast channel, and the quality of the channel is the reception quality of the broadcast channel at the mobile communication terminal.

According to a fifteenth aspect of the present invention, in the thirteenth aspect, the first base station controls the transmission power of the channel corresponding to the reception quality of the channel at the mobile communication terminal, and the quality of the channel is the size of the transmission power.

According to a sixteenth aspect of the present invention, in the thirteenth aspect, the mobile communication terminal controls the transmission power of the channel at the first base station corresponding to the reception quality of the channel, and the quality of the channel is the size of the transmission power.

According to a seventeenth aspect of the present invention, in the thirteenth aspect, in case that the quality of the channel is without the predetermined first range, regardless of the size of the change of the quality of the channel, the reception quality of the second frequency is measured at the mobile communication terminal.

According to an eighteenth aspect of the present invention, in the thirteenth aspect, the first base station transmits data by compressing the data in the time and also makes a data vacant time in which data is not transmitted, and the mobile communication terminal measures the reception quality of the second frequency in the data vacant time.

According to a nineteenth aspect of the present invention, for achieving the object mentioned above, there is provided a method changing over to a different frequency in a cellular phone system. And the cellular phone system provides a mobile communication terminal, a first base station that communicates with the mobile communication terminal by using a first frequency, and a second base station that communicates with the mobile communication terminal by using a second frequency. And the method changing over to a different frequency provides the steps of, while the mobile communication terminal is communicating with the first base station by using a channel, measuring the reception quality of the second frequency corresponding to the change of the quality of the channel, and executing communication by changing over the channel to the second base station corresponding to the measured reception quality and the change of the quality of the channel. And the method changing over to a different frequency further provides the steps of, measuring the reception quality of the second frequency at the mobile communication terminal in case that the quality of the channel is within a predetermined first range and when the change of the quality of the channel is larger than a designated value, and measuring more frequently the reception quality of the second frequency at the mobile communication terminal in case that the quality of the channel is without the predetermined first range, compared with the case that the quality of the channel is within the predetermined first range.

According to a twentieth aspect of the present invention, in the nineteenth aspect, the first base station transmits a broadcast channel, and the quality of the channel is the reception quality of the broadcast channel at the mobile communication terminal.

According to a twenty-first aspect of the present invention, in the nineteenth aspect, the first base station controls the transmission power of the channel corresponding to the reception quality of the channel at the mobile communication terminal, and the quality of the channel is the size of the transmission power.

According to a twenty-second aspect of the present invention, in the nineteenth aspect, the mobile communication terminal controls the transmission power of the channel at the first base station corresponding to the reception quality of the channel, and the quality of the channel is the size of the transmission power.

According to a twenty-third aspect of the present invention, in the nineteenth aspect, in case that the quality of the channel is without the predetermined first range, regardless of the size of the change of the quality of the channel, the reception quality of the second frequency is measured at the mobile communication terminal.

According to a twenty-fourth aspect of the present invention, in the nineteenth aspect, the first base station transmits data by compressing the data in the time and also makes a data vacant time in which data is not transmitted, and the mobile communication terminal measures the reception quality of the second frequency in the data vacant time.

BRIEF DESCRIPTION OF THE DRAWINGS

The objects and features of the present invention will become more apparent from the consideration of the following detailed description taken in conjunction with the accompanying drawings in which:

FIG. 13 is a flowchart showing a second part of the control operation at the controller for changing over to different frequency at the first embodiment of the present invention;

FIG. 14 is a flowchart showing a third part of the control operation at the controller for changing over to different frequency at the first embodiment of the present invention;

FIG. 17 is a flowchart showing a third part of the control operation at the controller for changing over to different frequency at the second embodiment of the present invention;

DESCRIPTION OF THE PREFERRED EMBODIMENTS

Figure 1:
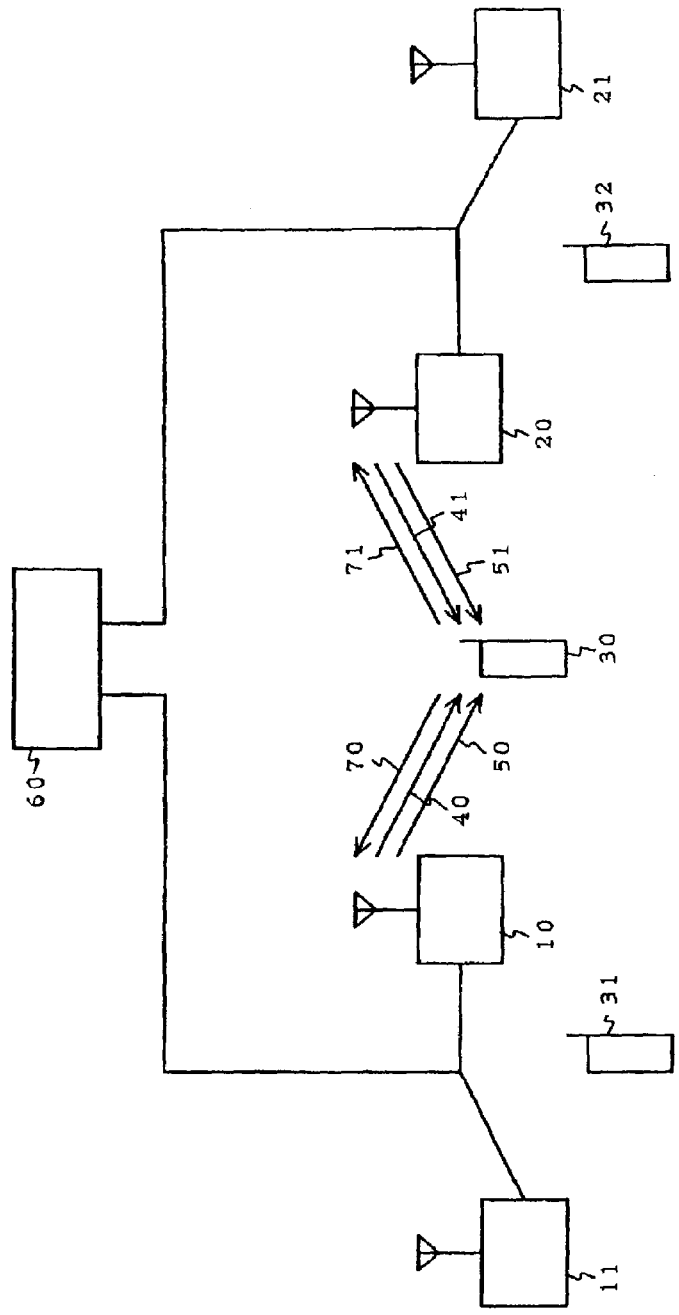
FIG. 1 is a block diagram showing a structure of a cellular phone system using a CDMA system at a first embodiment of the present invention.

Referring now to the drawings, embodiments of the present invention are explained in detail. In the explanation of the embodiments of the present invention, the drawings used at the explanation of the conventional technologies are also used. That is, FIGS. 1 to 6 are used at the explanation of the embodiments of the present invention. Further, in the explanation of the embodiments of the present invention, the communication between a mobile communication terminal and a base station controlling apparatus is executed via a base station. Therefore, for example, in case that an expression, which a mobile communication terminal transmits information to a base station controlling apparatus, exists, this signifies that the information is actually transmitted from the mobile communication terminal to the base station controlling apparatus via the base station.

FIG. 1 is a block diagram showing a structure of a cellular phone system using a CDMA system at a first embodiment of the present invention. In FIG. 1, a case, in which the cellular phone system uses two carrier frequencies in one service area, is shown.

In FIG. 1, each of mobile communication terminals 30 to 32 can connects its channel to any of base stations 10, 11, 20, and 21. Further, in FIG. 1, a base station controlling apparatus 60, broadcast channels 40 and 41, individual downstream channels 50 and 51, and individual upstream channels 70 and 71 are shown. In FIG. 1, the number of the mobile communication terminals is three, however, this number is not limited to three, and the number of the base stations is four, however, this number in not limited to four.

The base station 10 communicates with the mobile communication terminal 30 by using a first frequency, and the base station 20 communicates with the mobile communication terminal 30 by using a second frequency. While the mobile communication terminal 30 is communicating with the base station 10 with its channel, the mobile communication terminal 30 measures the reception quality of the second frequency corresponding to the change of the channel quality. And based on the measured reception quality, the mobile communication terminal 30 changes over its channel to the base station 20 and communicates with the base station 20.

In case that the channel quality of the first frequency is within a first range, when the change of the channel quality became larger than a designated value, the mobile communication terminal 30 measures the reception quality of the second frequency. And in case that the channel quality of the first frequency is without the first range, the mobile communication terminal 30 measures the reception quality of the second frequency in more frequent times, compared with the case within the first range.

Figure 2:
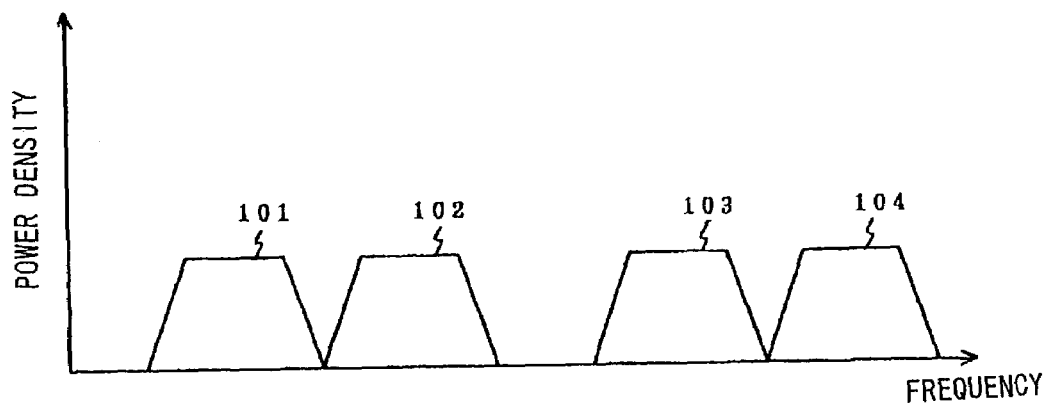
FIG. 2 is a graph showing the positions of carrier frequencies in an upstream channel and a downstream channel at embodiments of the present invention.

FIG. 2 is a graph showing the positions of carrier frequencies in an upstream channel and a downstream channel at the embodiments of the present invention. In FIG. 2, the carrier frequency, which the mobile communication terminal 30 uses in the channel with the base stations 10 and 11, is a carrier frequency 101 at the upstream channel and a carrier frequency 103 at the downstream channel. And the carrier frequency, which the mobile communication terminal 30 uses in the channel with the base stations 20 and 21, is a carrier frequency 102 at the upstream channel and a carrier frequency 104 at the downstream channel.

And the mobile communication terminal 30 or the base station controlling apparatus 60 executes the control changing over to a different frequency by judging whether the mobile communication terminal 30 connects to the base stations 10 and 11 or the base stations 20 and 21 during the communication of the mobile communication terminal 30. In this, the control of the transmission power is adopted in the upstream and downstream channels.

In the measurement of the different frequency at the mobile communication terminal 30, the transmission data in the downstream channel are compressed in the time by using a method lowering its diffusion rate or a method making its coding rate higher by that a part of coded data is not transmitted. With this compression, a vacant time in which data are not transmitted is provided, and the measurement of the different frequency is executed by using this data vacant time.

Figure 3:
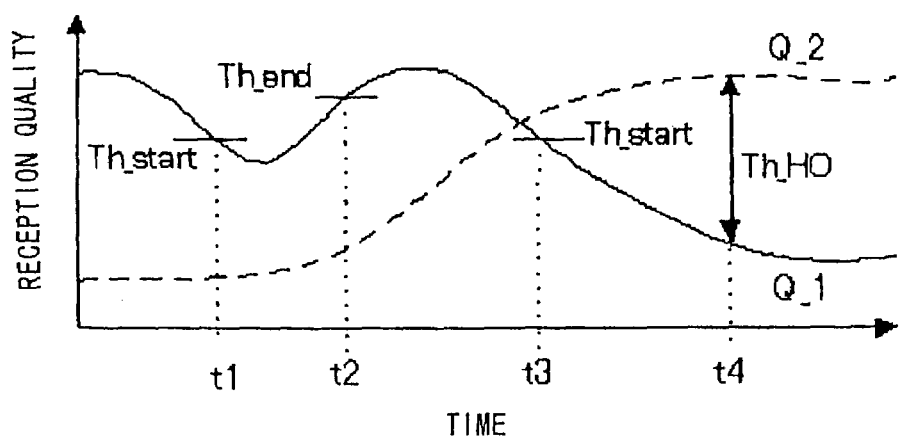
FIG. 3 is a first reception quality graph showing waveforms of the reception quality in the passage of time at the embodiments of the present invention.
Figure 4:
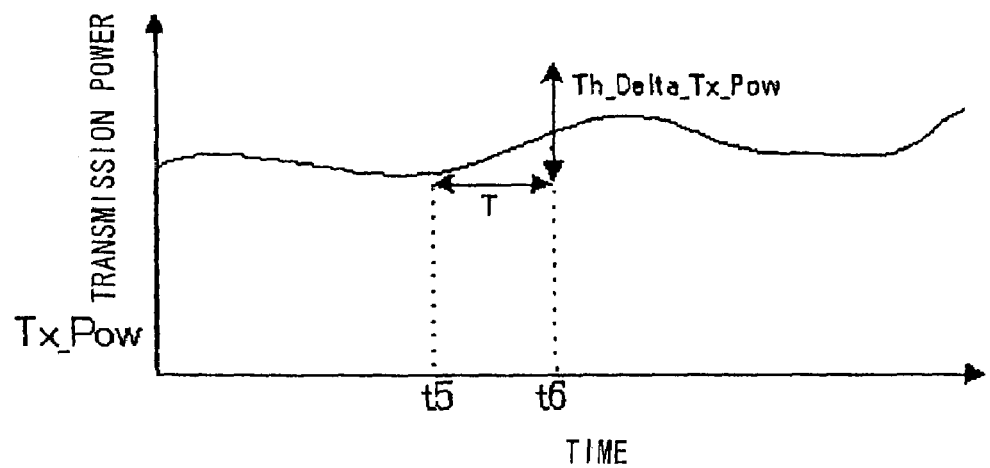
FIG. 4 is a first transmission power graph showing a waveform of the transmission power at an individual channel in the passage of time at the embodiments of the present invention.
Figure 5:
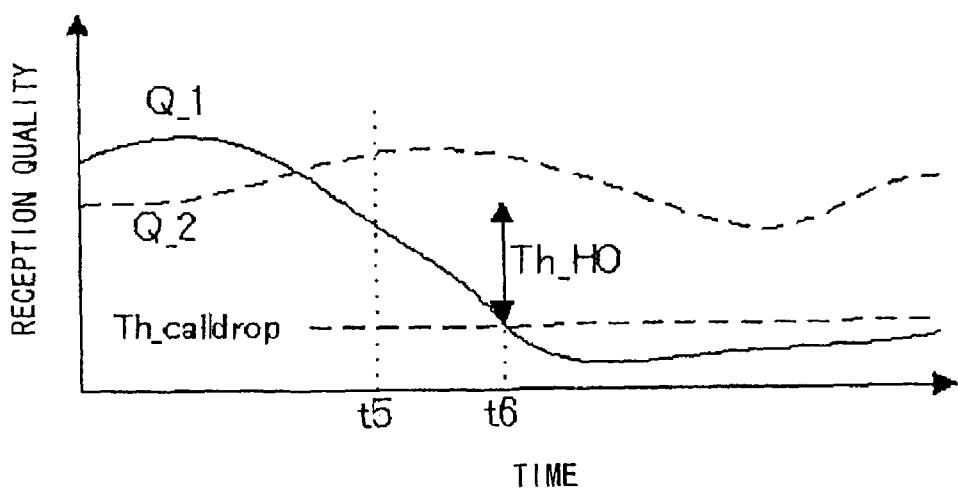
FIG. 5 is a second reception quality graph showing waveforms of the reception quality in the passage of time at the embodiments of the present invention.
Figure 6:
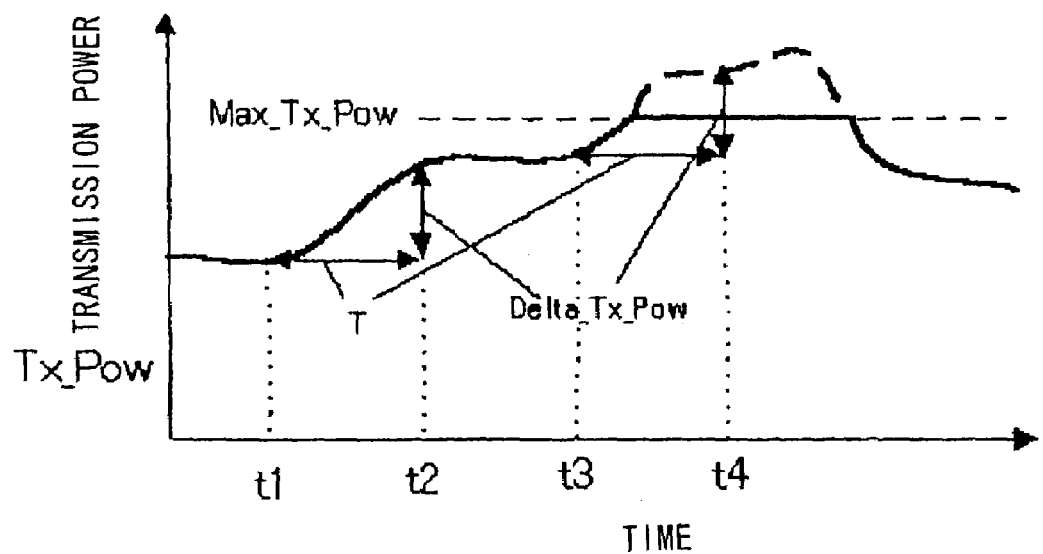
FIG. 6 is a second transmission power graph showing a waveform of the transmission power at an individual channel in the passage of time at the embodiments of the present invention.
Figure 7:
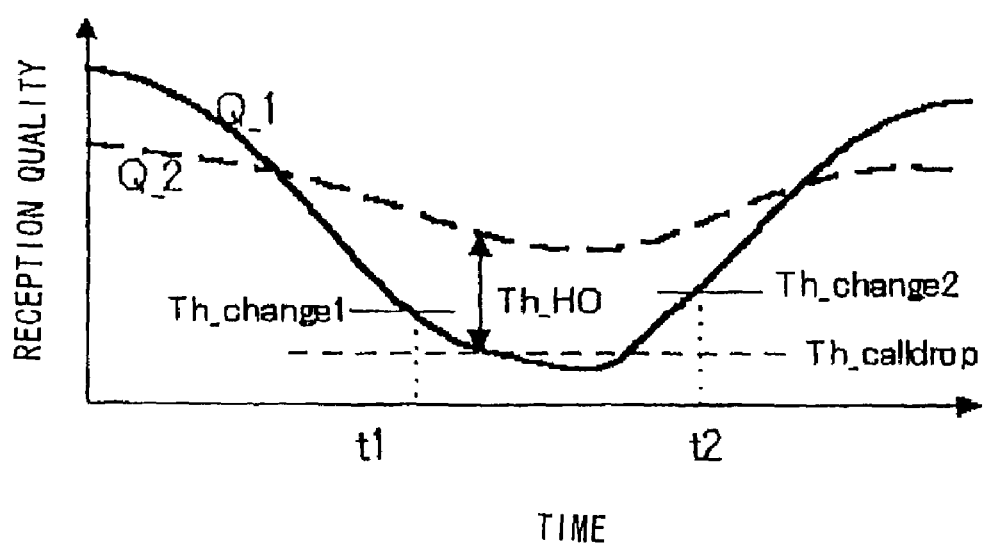
FIG. 7 is a third reception quality graph showing waveforms of the reception quality in the passage of time at the embodiments of the present invention.
Figure 8:
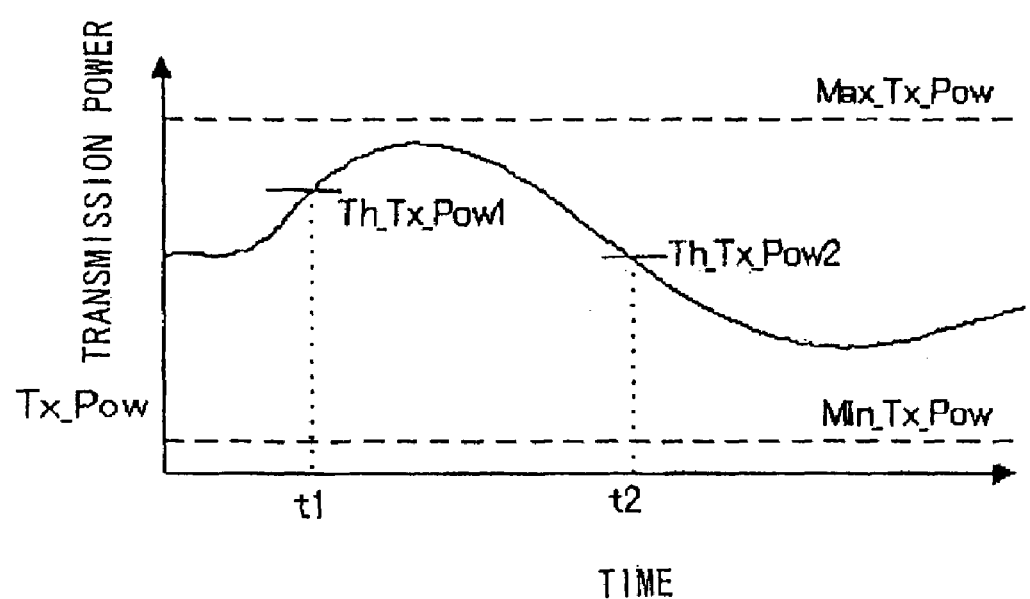
FIG. 8 is a third transmission power graph showing a waveform of the transmission power at an individual channel in the passage of time at the embodiments of the present invention.

FIG. 3 is a first reception quality graph showing waveforms of the reception quality in the passage of time at the embodiments of the present invention. FIG. 4 is a first transmission power graph showing a waveform of the transmission power at an individual channel in the passage of time at the embodiments of the present invention. FIG. 5 is a second reception quality graph showing waveforms of the reception quality in the passage of time at the embodiments of the present invention. FIG. 6 is a second transmission power graph showing a waveform of the transmission power at an individual channel in the passage of time at the embodiments of the present invention. FIG. 7 is a third reception quality graph showing waveforms of the reception quality in the passage of time at the embodiments of the present invention. FIG. 8 is a third transmission power graph showing a waveform of the transmission power at an individual channel in the passage of time at the embodiments of the present invention.

In FIG. 3, the mobile communication terminal 30 measures the different frequency for a predetermined period T_start (not shown) as making the time t1 or the time t3 a start time, when the reception quality Q_1 of the broadcast channel at the currently using carrier frequency became less than the judging threshold value Th_start shown in the inequality (3). In this, at the measurement of the different frequency, the reception quality Q_2 of the broadcast channel of the carrier frequency, to which the carrier frequency is changed over, is measured. And the changing over to the different frequency is executed at the time, when the difference between the reception quality Q_1 of the broadcast channel at the currently using carrier frequency and the reception quality Q_2 of the broadcast channel of the carrier frequency to which the carrier frequency is changed over satisfies the condition shown in the inequality (2).

In this, the reception quality Q_2 is measured only for the predetermined period T_start from the judging threshold value Th_start, and is not measured from the judging threshold value Th_start to the judging threshold value Th_end. Therefore, the measuring period of the reception quality Q_2 becomes shorter than the period from the Th_start to the Th_end.

On the contrary, even after the predetermined period T_start passed, in case that the difference between the reception quality Q_1 of the broadcast channel at the currently using carrier frequency and the reception quality Q_2 of the broadcast channel of the carrier frequency to which the carrier frequency is changed over does not satisfy the condition shown in the inequality (2), the base station controlling apparatus 60 instructs the mobile communication terminal 30 to stop the measurement of the different frequency. Further, the base station controlling apparatus 60 instructs the base station 10 currently connecting to the mobile communication terminal 30 to measure the transmission power Tx_Pow and the change of the transmission power Delta_Tx_Pow of the individual channel at the downstream channel for the mobile communication terminal 30.

After this, in case that the change of the transmission power Delta_Tx_Pow of the individual channel satisfied the inequality (6), the base station controlling apparatus 60 instructs the mobile communication terminal 30 to measure the different frequency for a predetermined period T_ob (not shown). When the result of the measurement satisfied the inequality (2), the changing over to the different frequency is executed. After the predetermined period T_ob passed, the measurement of the different frequency is stopped, and again the measurement of the change of the transmission power Delta_Tx_Pow of the individual channel is executed until the inequality (6) is satisfied.

As mentioned above, the inequality (7) has the same basic concept that the inequality (6) has. That is, the measurement of the different frequency is not started at the time when the inequality (7), in which the change of the transmission power of an individual channel Delta_Tx_Pow is smaller than the judging threshold value Th_Delta_Tx_Pow, was satisfied, and the measurement of the different frequency is not executed for a certain period.

At the cellular phone system of the first embodiment of the present invention, in order to avoid the phenomenon of the call drop, the following control method is newly added. In order to explain the newly added control method, FIG. 7 is used. In FIG. 7, the waveforms of the reception quality Q_1 of the broadcast channel of the currently using carrier frequency and the reception quality Q_2 of the broadcast channel of the carrier frequency to which the carrier frequency is changed over at the downstream channels of the mobile communication terminal 30 are shown in the passage of time.

The newly added control method is a method that is added to the conventional second improved method, and controls the start and the stop of the measurement of the different frequency at the conventional second improved method.

In FIG. 7, when the reception quality Q_1 of the broadcast channel of the currently using carrier frequency satisfied the following inequality (8), the newly added control method stops the control of the start and the stop of the measurement of the different frequency by the conventional second improved method.

$$Q\_1 < Th\_change\ 1 \qquad (8)$$

By the newly added control method, the probability generating the call drop becomes small. In this, the control of the start and the stop of the measurement of the different frequency by the conventional second improved method is started at the time when the reception quality Q_1 of the broadcast channel of the currently using carrier frequency satisfied the following inequality (9).

$$Q\_1 > Th\_change\ 2 \qquad (9)$$

In order to decrease the number of times of the control of the start and the stop of the measurement of the different frequency by the judging threshold values, the threshold value of the Th_change 1 in the inequality (8) and the threshold value of the Th_change 2 in the inequality (9) are set to satisfy the following inequality (10) and a margin has between the two threshold values.

$$Th\_change\ 2 - Th\_change\ 1 > 0 \tag{10}$$

In FIG. 3, the control of the measurement of the different frequency mentioned above is stopped at the time t2 when the reception quality Q_1 of the broadcast channel of the currently using carrier frequency became over the judging threshold value Th_end. Or the control changing over to the different frequency is started at the time t4 when the inequality (2) was satisfied and the measurement of the different frequency is stopped at the same time.

In case that a mobile communication terminal has been connected to plural base stations during its hand over, when the measurement of the transmission power of individual channels for the mobile communication terminal is instructed to the plural base stations, this instruction can be made to a base station, which has the best channel condition with the mobile communication terminal, or to the plural base stations.

Figure 9:
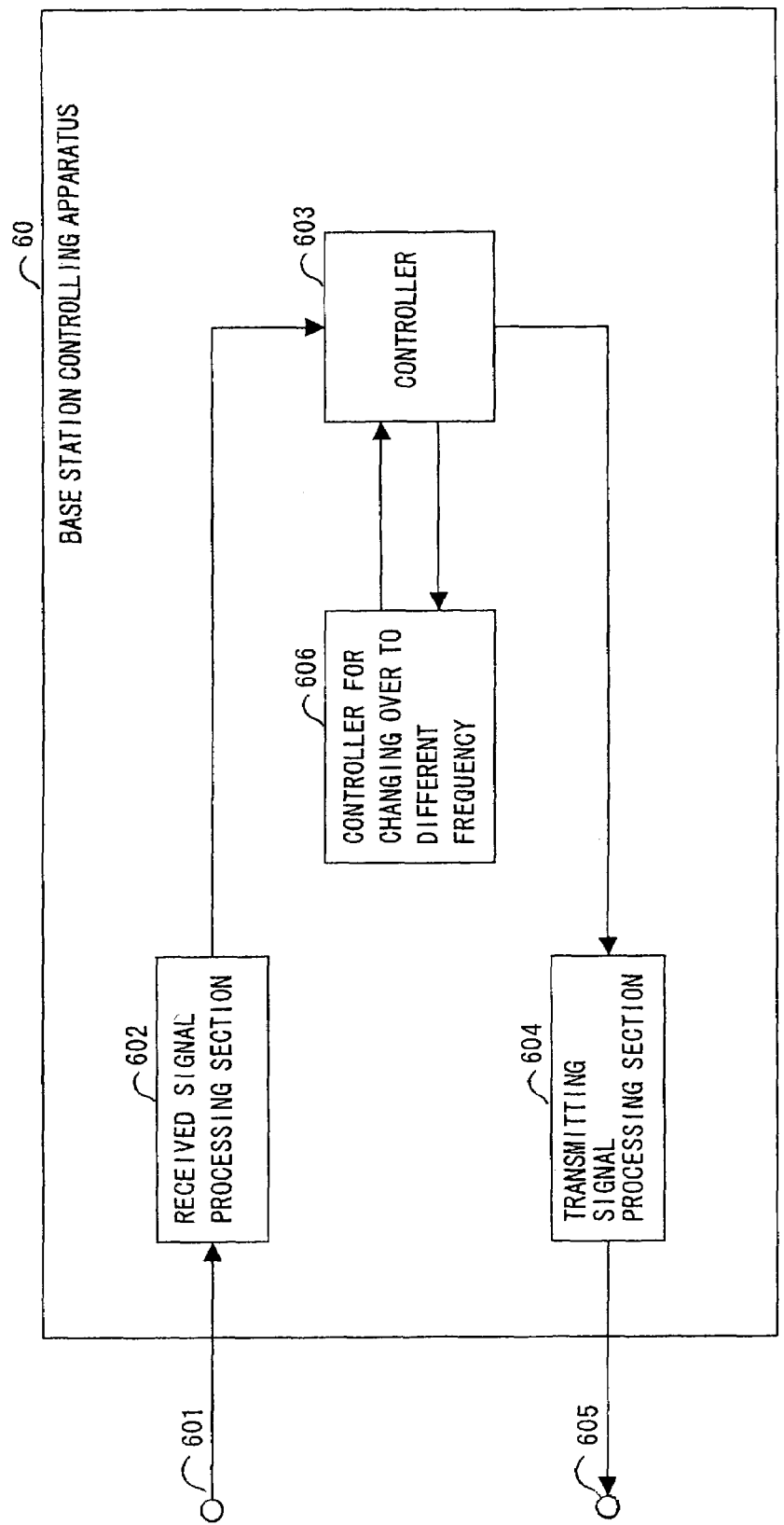
FIG. 9 is a block diagram showing a structure of a base station controlling apparatus shown in FIG. 1.

Next, the base station controlling apparatus 60 shown in FIG. 1 is explained in detail. FIG. 9 is a block diagram showing a structure of the base station controlling apparatus 60 shown in FIG. 1. As shown in FIG. 9, the base station controlling apparatus 60 provides an input terminal 601, a received signal processing section 602, a controller 603, a transmitting signal processing section 604, an output terminal 605, and a controller for changing over to different frequency 606.

The input terminal 601 receives signals from one or plural base stations 10, 11, 20, and 21. The received signal processing section 602 processes the received signals inputted from the input terminal 601. The controller 603 executes control based on control signals from the mobile communication terminals 30, 31, and 32 or the base stations 10, 11, 20, and 21. The transmitting signal processing section 604 processes signals to be transmitted. The output terminal 605 transmits signals to one or plural base stations 10, 11, 20, and 21. The controller for changing over to different frequency 606 judges the measurement of the different frequency and the changing over to the different frequency by receiving control signals from the controller 603.

The controller 603 executes the control of the channel setting between the mobile communication terminals 30, 31, and 32, and the base stations 10, 11, 20, and 21. The controller for changing over to different frequency 606 receives control signals, which request to measure a different frequency and to change over to the different frequency, from the mobile communication terminals 30, 31, and 30 via the base stations 10, 11, 20, and 21. And controller for changing over to different frequency 606 outputs control signals for measuring the different frequency, for making data vacant time of individual channels, and for changing over to the different frequency to the base stations 10, 11, 20, and 21 that have been connected to the mobile communication terminals 30, 31, and 32.

The controller for changing over to different frequency 606 judges the changing over to the different frequency, by receiving the information of the reception quality of carrier frequency of the mobile communication terminals 30, 31, and 32 from the controller 603. Further, the controller for changing over to different frequency 606 judges the changing over to the different frequency, by receiving the information of the transmission power of the base stations 10, 11, 20, and 21 from the controller 603.

Figure 10:
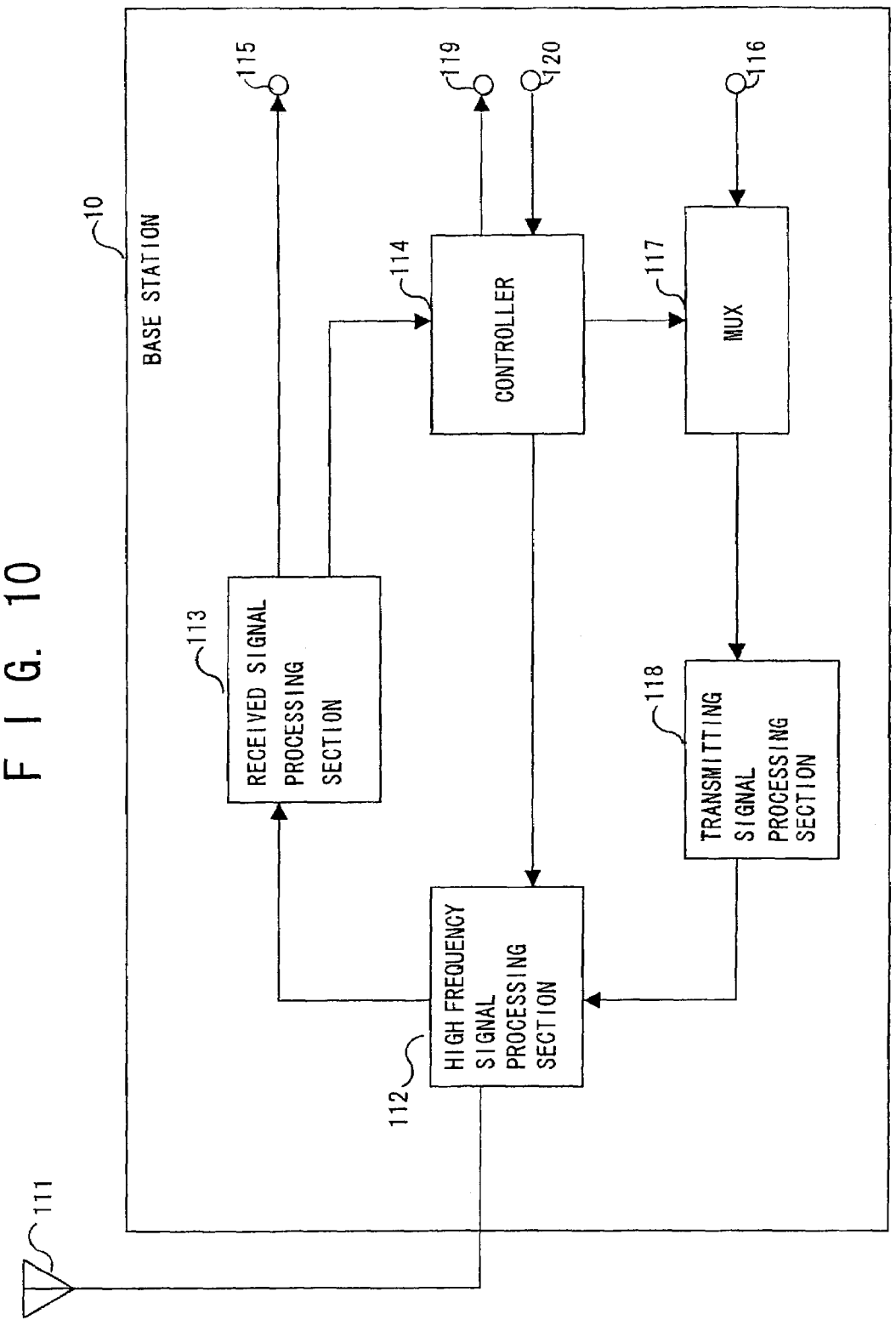
FIG. 10 is a block diagram showing a structure of a base station shown in FIG. 1.

Next, the base station 10 in FIG. 1 is explained in detail. FIG. 10 is a block diagram showing a structure of the base station 10 shown in FIG. 1. In this, the structure of each of the base stations 10, 11, 20, and 21 is the same, therefore, the same explanation is omitted.

The base station 10 provides an antenna 111, a high frequency signal processing section 112, a received signal processing section 113, a controller 114, a first output terminal 115, a first input terminal 116, a multiplexer (MUX) 117, a transmitting signal processing section 118, a second output terminal 119, and a second input terminal 120.

The antenna 111 receives signals from one or plural mobile communication terminals 30, 31, and 32, and transmits signals to one or plural mobile communication terminals 30, 31, and 32. The high frequency signal processing section 112 processes received high frequency signals and also processes transmitting high frequency signals. The received signal processing section 113 processes the received signals. The controller 114 executes control by using the information transmitted from the base station controlling apparatus 60, received at the second input terminal 120. The second output terminal 119 transmits control information from the controller 114 to the base station controlling apparatus 60. The first output terminal 115 outputs received data processed at the received signal processing section 113. The first input terminal 116 receives data to be transmitted. The MUX 117 multiplexes the data to be transmitted and control signals from the controller 114. The transmitting signal processing section 118 processes the data multiplexed at the MUX 117.

The high frequency signal processing section 112 receives a control signal changing over to a different frequency from the controller 114, and changes over the frequency using at reception or transmission. The controller 114 receives the reception quality from the received signal processing section 113, and controls the transmission power for the mobile communication terminals 30, 31, and 32. And the controller 114 controls the reception and transmission of the base station 10, based on a control signal received from the base station controlling apparatus 60.

Moreover, the controller 114 receives a control signal changing over to a different frequency from the base station controlling apparatus 60, and sends the control signal changing over to the different frequency, which is used for the reception or the transmission, to the high frequency signal processing section 112. And the controller 114 receives a control signal changing over to the different frequency from the base station controlling apparatus 60, and sends a control signal for making the data vacant time of individual channels to the high frequency signal processing section 112.

Furthermore, the controller 114 has a function to measure the transmission power of its own station (base station 10) by receiving a control signal for measuring the transmission power of its own station from the base station controlling apparatus 60. And the controller 114 has a function to send the measured transmission power of its own station to the base station controlling apparatus 60.

Figure 11:
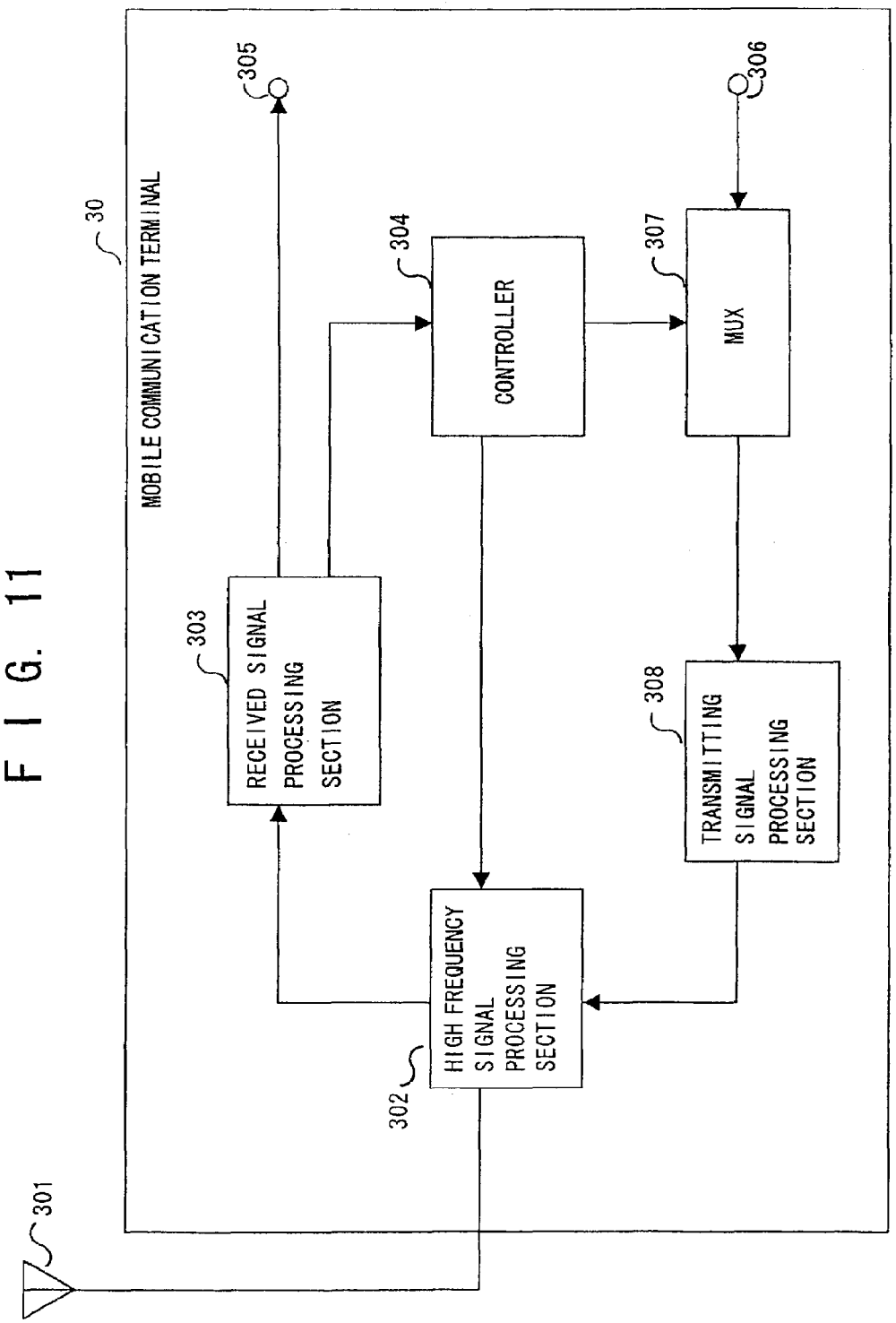
FIG. 11 is a block diagram showing a structure of a mobile communication terminal shown in FIG. 1.

Next, the mobile communication terminal 30 in FIG. 1 is explained in detail. FIG. 11 is a block diagram showing a structure of the mobile communication terminal 30 shown in FIG. 1. In this, the structure of each of the mobile communication terminals 30, 31, and 32 is the same, therefore, the same explanation is omitted.

The mobile communication terminal 30 provides an antenna 301, a high frequency signal processing section 302, a received signal processing section 303, a controller 304, an output terminal 305, an input terminal 306, a multiplexer (MUX) 307, and a transmitting signal processing section 308.

The antenna 301 receives signals from one or plural base stations 10, 11, 20, and 21, and transmits signals to one or plural base stations 10, 11, 20, and 21. The high frequency signal processing section 302 processes received high frequency signals and also processes transmitting high frequency signals. The received signal processing section 303 processes the received signals. The controller 304 executes control based on control signals from the received signal processing section 303. The output terminal 305 outputs received data. The input terminal 306 receives data to be transmitted. The MUX 307 multiplexes the data to be transmitted inputted from the input terminal 306 and control signals from the controller 304. The transmitting signal processing section 308 processes the data multiplexed at the MUX 307.

The controller 304 cyclically measures a broadcast channel transmitted from, for example, the base station 10, received at the received signal processing section 303, and processes the information of the measured result for transmitting to the base station controlling apparatus 60. And the controller 304 measures the reception quality based on the signal from the received signal processing section 303, and generates transmission power control signals for one or plural base stations 10, 11, 20, and 21. The controller 304 controls the transmission power based on the received control signals from one or plural base stations 10, 11, 20, and 21.

The main control operation at the first embodiment of the present invention is executed at the controller for changing over to different frequency 606 in the base station controlling apparatus 60 shown in FIG. 9.

Next, referring to the drawings, the control operation at the controller for changing over to different frequency 606 at the first embodiment of the present invention is explained.

Figure 12:
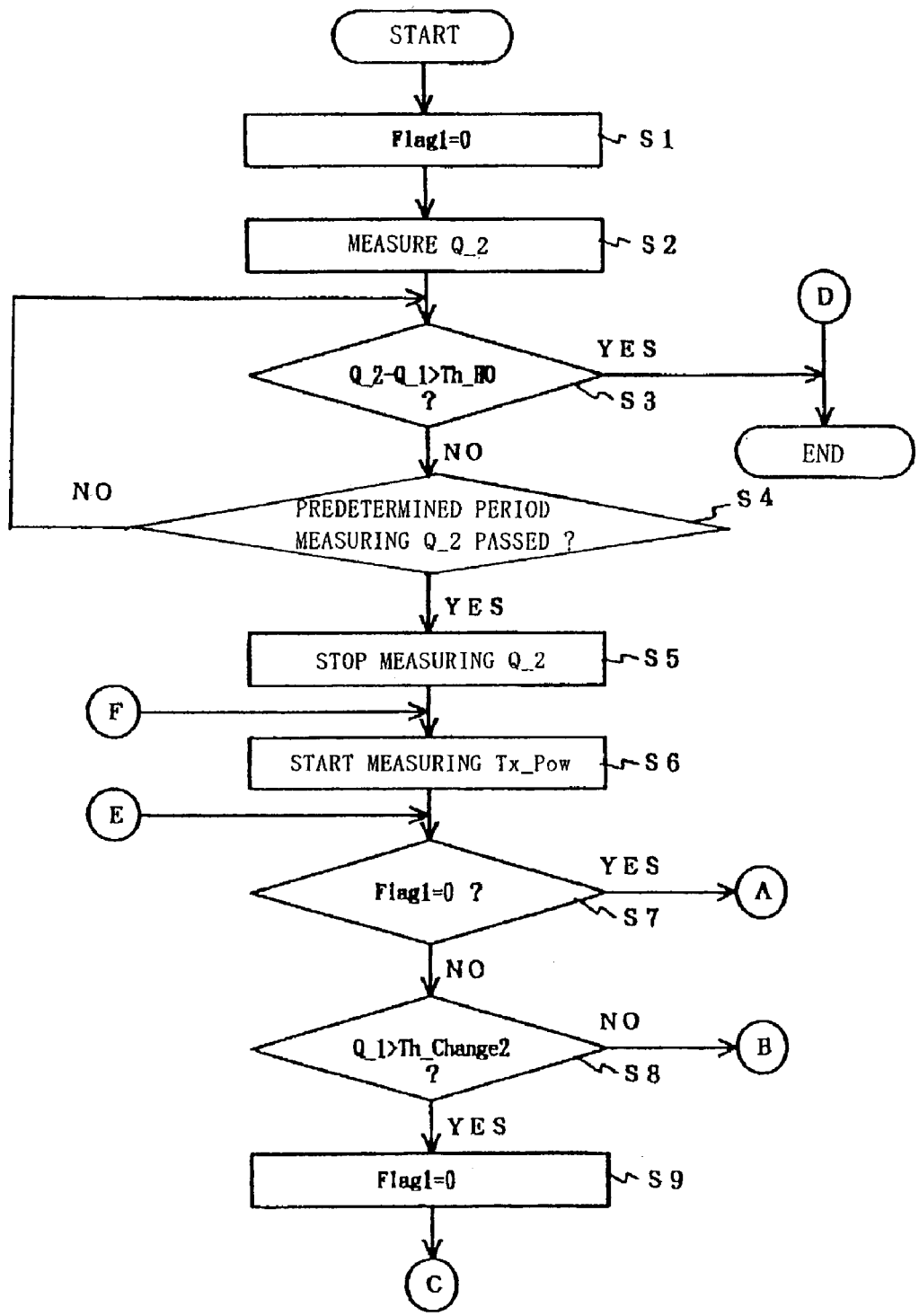
FIG. 12 is a flowchart showing a first part of the control operation at a controller for changing over to different frequency at the first embodiment of the present invention.

FIG. 12 is a flowchart showing a first part of the control operation at the controller for changing over to different frequency 606 at the first embodiment of the present invention. FIG. 13 is a flowchart showing a second part of the control operation at the controller for changing over to different frequency 606 at the first embodiment of the present invention. FIG. 14 is a flowchart showing a third part of the control operation at the controller for changing over to different frequency 606 at the first embodiment of the present invention.

The controller for changing over to different frequency 606 instructs the mobile communication terminal 30 to measure the reception quality Q_1 of the currently using carrier frequency, and receives the measured result. In this case, the start time of the control is the time, in which the inequality (3) was satisfied at the controller for changing over to different frequency 606. And the end time of the control signifies the execution of the changing over to the different frequency.

In the explanation of the control operation of the controller for changing over to different frequency 606 at the first embodiment of the present invention, each of the step numbers is shown in FIGS. 12 to 14.

When the control mentioned above was started, the controller for changing over to different frequency 606 sets the control flag (Flag 1) to be 0 (step S1). And the controller for changing over to different frequency 606 instructs the mobile communication terminal 30 to measure the reception quality Q_2 of the carrier frequency to which the carrier frequency is changed over for a predetermined period T_start, and receives the measured result (step S2).

After this, the controller for changing over to different frequency 606 executes the judgement of the inequality (2) for the reception quality Q_2 of the carrier frequency to which the carrier frequency is changed over and the reception quality Q_1 of the currently using carrier frequency (step S3). When the inequality (2) was satisfied (YES at the step S3), the controller for changing over to different frequency 606 changes over the carrier frequency from the currently using carrier frequency to the different carrier frequency. With this, the control operation at the controller for changing over to different frequency 606 ends.

When the inequality (2) was not satisfied (NO at the step S3), the controller for changing over to different frequency 606 judges whether the predetermined period T_start, for which the reception quality Q_2 of the carrier frequency to which the carrier frequency is changed over is measured, passed or not (step S4). When the condition at the step S4 was not satisfied, the operation returns to the step S3.

When the condition at the step S4 was satisfied, the controller for changing over to different frequency 606 instructs the mobile communication terminal 30 to stop the measurement of the reception quality Q_2 of the carrier frequency to which the carrier frequency is changed over (step S5). After the step S5, the controller for changing over to different frequency 606 instructs the base station 10 to start measuring the transmission power Tx_Pow of the individual channel at the downstream channel for the mobile communication terminal 30 (step S6).

After the step S6, the controller for changing over to different frequency 606 judges whether the control flag (Flag 1) is 0 or not (step S7). When the condition at the step S7 was not satisfied, the controller for changing over to different frequency 606 judges whether the inequality (9) is satisfied or not for the reception quality Q_1 of the currently using carrier frequency (step S8).

When the condition at the step S7 was satisfied, the control operation goes to the control operation shown in FIG. 13. And the controller for changing over to different frequency 606 judges whether the inequality (8) is satisfied or not for the reception quality Q_1 of the currently using carrier frequency (step S10). When the condition at the step S10 was satisfied, the controller for changing over to different frequency 606 sets the control flag (Flag 1) to be 1 (step S11). After this, the controller for changing over to different frequency 606 instructs the base station 10 to stop measuring the transmission power Tx_Pow of the individual channel at the downstream channel for the mobile communication terminal 30 (step S12).

After the step S12, the controller for changing over to different frequency 606 instructs the mobile communication terminal 30 to measure the reception quality Q_2 of the carrier frequency to which the carrier frequency is changed over, and receives the measured result (step S13). And the controller for changing over to different frequency 606 executes the judgement of the inequality (2) for the reception quality Q_2 of the carrier frequency to which the carrier frequency is changed over and the reception quality Q_1 of the currently using carrier frequency (step S14). When the inequality (2) was satisfied (YES at the step S14), the controller for changing over to different frequency 606 changes over the carrier frequency from the currently using carrier frequency to the different carrier frequency. With this, the control operation at the controller for changing over to different frequency 606 ends.

When the inequality (2) was not satisfied (NO at the step S14), the control operation returns to the step S7 in FIG. 12. And the controller for changing over to different frequency 606 judges whether the control flag (Flag 1) is 0 or not (step S7). When the control flag (Flag 1) was not 0, the inequality (9) is judged (step S8).

When the condition at the step S8 was satisfied, the controller for changing over to different frequency 606 sets the control flag (Flag 1) to be 0 (step S9). And the control operation goes to the control operation shown in FIG. 14. And the judgement at the inequality (6) is executed (step S15). When the condition at the step S15 was not satisfied, the control operation returns to the step S7 shown in FIG. 12.

When the condition at the step S15 was satisfied, the controller for changing over to different frequency 606 instructs the base station 10 to stop measuring the transmission power Tx_Pow of the individual channel at the downstream channel for the mobile communication terminal 30 (step S16). After the step S16, the controller for changing over to different frequency 606 instructs the mobile communication terminal 30 to measure the reception quality Q_2 of the carrier frequency to which the carrier frequency is changed over for a predetermined period T_ob, and receives the measured result (step S17).

After the step S17, the controller for changing over to different frequency 606 executes the judgement of the inequality (2) (step S18). When the inequality (2) was not satisfied (NO at the step S18), the controller for changing over to different frequency 606 judges whether the predetermined time T_ob, for which the reception quality Q_2 of the carrier frequency to which the carrier frequency is changed over is measured, passed or not (step S19). When the condition at the step S19 was satisfied, the operation returns to the step S6 shown in FIG. 12.

When the condition at the step S18 was satisfied, the controller for changing over to different frequency 606 changes over the carrier frequency from the currently using carrier frequency to the different carrier frequency. At the control operation mentioned above, when the inequality (4) was satisfied, the control operation at the controller for changing over to different frequency 606 ends.

As mentioned above, at the first embodiment of the present invention, the control of measuring the different frequency corresponding to the change of the transmission power of the individual channel at the downstream channel is started, at the time when the reception quality of the broadcast channel of the currently using carrier frequency was deteriorated and after this the condition of the inequality (3) was satisfied.

By the control mentioned above, the unnecessary load for the control of the measurement of the different frequency can be decreased at the state in which the reception quality of the broadcast channel of the currently using carrier frequency is good. And in case that the transmission data have been compressed in the time at the time measuring the different frequency, the ratio of the data vacant time to the communication time at measuring the different frequency can be lowered.

Further, as mentioned at the step S15, the judgement of the start and the stop of the control of the measurement of the different frequency is executed corresponding to the change of the transmission power of the individual channel at the downstream channel. By this operation, at the time when the transmission power of the individual channel at the downstream channel was increased, that is, at the time when the channel quality at the downstream channel was deteriorated, the measurement of the different frequency is started and executed for a certain period. With this, the unnecessary measurement of the different frequency is not executed at the time when the channel quality is good, and the power consumption at measuring the different frequency can be decreased.

At the first embodiment of the present invention, the measurement of the different frequency is not executed while the control of the measurement of the different frequency corresponding to the change of the transmission power of the individual channel at the downstream channel is working. And the probability generating the call drop, which occurs at the time when the reception quality of the currently using carrier frequency was deteriorated, is decreased. In order to achieve the operation mentioned above, as mentioned at the step S10, the following control is added. That is, when the reception quality of the broadcast channel of the currently using carrier frequency satisfied the inequality (8), the control of the measurement of the different frequency by the change of the transmission power of the individual channel is stopped and the measurement of the different frequency is executed.

That is, at the control operation of the first embodiment of the present invention, in case that the reception quality Q_1 of the currently using carrier frequency is within the first range of the Flag 1=0, when the change of the reception quality Q_1 is larger than the designated value, the reception quality Q_2 of the carrier frequency to which the carrier frequency is changed over is measured. And in case that the reception quality Q_1 of the currently using carrier frequency is without the first range of the Flag 1=0, that is, in the Flag 1=1, the reception quality Q_2 of the carrier frequency to which the carrier frequency is changed over is measured in more frequent times, compared with the case within the first range.

By the control operation mentioned above, at the first embodiment of the present invention, the probability, which achieves the changing over to the different frequency before the call drop occurs, can be made to be high at the small ratio of the data vacant time. Therefore, at the first embodiment of the present invention, the deterioration of the channel quality and the probability generating the call drop phenomenon, caused by the imperfection of the control of the changing over to the different frequency, can be made to be small, and the channel quality can be made to be higher.

Next, referring to the drawings, a second embodiment of the present invention is explained. At the second embodiment of the present invention, the cellular phone system using the CDMA system is the same at the first embodiment shown in FIG. 1. That is, the cellular phone system uses two carrier frequencies in one service area.

And the positions of carrier frequencies in an upstream channel and a downstream channel at the second embodiment are the same at the first embodiment shown in FIG. 2. That is, the mobile communication terminal 30 can connect to the base stations 10, 11, 20, and 21 with its channel. The carrier frequency, which the mobile communication terminal 30 uses in the channel with the base stations 10 and 11, is a carrier frequency 101 at the upstream channel and a carrier frequency 103 at the downstream channel.

And the carrier frequency, which the mobile communication terminal 30 uses in the channel with the base stations 20 and 21, is a carrier frequency 102 at the upstream channel and a carrier frequency 104 at the downstream channel. The mobile communication terminal 30 or the base station controlling apparatus 60 controls the control of the changing over to the different frequency whether the mobile communication terminal 30 connects to the base stations 10 and 11 or the base stations 20 and 21 during the communication of the mobile communication terminal 30. In this, the control of the transmission power is adopted at the upstream channel and the downstream channel.

In the measurement of the different frequency at the mobile communication terminal 30, the transmission data in the downstream channel are compressed in the time by using a method lowering its diffusion rate or a method making its coding rate higher by that a part of coded data is not transmitted. With this compression, a vacant time in which data are not transmitted is provided, and the measurement of the different frequency is executed by using this data vacant time.

As mentioned above, at the second embodiment of the present invention, FIG. 3 is also used. That is, in FIG. 3, the waveform of the reception quality Q_1 of the broadcast channel at the currently using carrier frequency 103 and the waveform of the reception quality Q_2 of the broadcast channel at the carrier frequency 104 to which the carrier frequency is changed over are shown, at the downstream channel for the mobile communication terminal 30.

In FIG. 3, the mobile communication terminal 30 executes the measurement of the different frequency by making the time t1 or t3 as its starting point, which the reception quality Q_1 of the broadcast channel at the currently using carrier frequency 103 became less than the judging threshold value Th_start in the inequality (3), for a predetermined period T_start. In this, the measurement of the different frequency is the measurement of the reception quality Q_2 of the broadcast channel of the carrier frequency to which the carrier frequency is changed over. And the changing over to the different frequency is executed by making the time, when the difference between the reception quality Q_2 of the carrier frequency to which the carrier frequency is changed over and the reception quality Q_1 of the broadcast channel at the currently using carrier frequency satisfied the inequality (2) in the predetermined period T_start, as its starting point.

In case that the difference between the reception quality Q_2 of the carrier frequency to which the carrier frequency is changed over and the reception quality Q_1 of the broadcast channel at the currently using carrier frequency did not satisfy the inequality (2) even the predetermined period T_start passed, the base station controlling apparatus 60 instructs the mobile communication terminal 30 to stop measuring the different frequency. Further the base station controlling apparatus 60 instructs the base station 10 currently connecting to the mobile communication terminal 30 to measure the transmission power Tx_Pow and the change of the transmission power Delta_Tx_Pow of the individual channel at the downstream channel for the mobile communication terminal 30.

After this, when the change of the transmission power Delta_Tx_Pow of the individual channel at the downstream channel satisfied the inequality (6), the base station controlling apparatus 60 instructs the mobile communication terminal 30 to measure the different frequency for a predetermined period T_ob. And when the measured result satisfied the inequality (2), the measurement of the different frequency is executed. After the period T_ob passed, the measurement of the different frequency is stopped, and the change of the transmission power Delta_Tx_Pow of the individual channel at the downstream channel is continued again until the inequality (6) is satisfied.

At the second embodiment of the present invention, in order to avoid the phenomenon of the call drop, in addition to the control operation at the first embodiment, a new control method is added. In order to explained the new control method, FIG. 8 mentioned before is used. In FIG. 8, a waveform of the transmission power Tx_Pow of the individual channel at the downstream channel for the base station 10 currently connecting to the mobile communication terminal 30 is shown in the passage of time.

In FIG. 8, the base station 10, which received an instruction to measure the transmission power of the individual channel for the mobile communication terminal 30 from the base station controlling apparatus 60, measures the change of the transmission power Delta_Tx_Pow of the individual channel shown in the inequality (6) until the transmission power Tx_Pow of the individual channel satisfies the following inequality (11).

$$Tx\_Pow > Th\_Tx\_Pow\ 1 \qquad (11)$$

And when the change of the transmission power Delta_Tx_Pow of the individual channel satisfied the inequality (6), the measurement of the different frequency is executed for a certain period.

When the transmission power Tx_Pow of the individual channel satisfied the inequality (11), in order to avoid the call drop, the measurement of the different frequency is continued, not depending on the change of the transmission power. At this control method, in FIG. 8, the changing over to the different frequency is stopped when the transmission power Tx_Pow of the individual channel satisfied the following inequality (12).

$$Tx\_Pow < Th\_Tx\_Pow\ 2 \qquad (12)$$

Especially, when the inequality (12) was satisfied, the control is changed to the measurement of the different frequency corresponding to the change of the transmission power in the inequality (6) again. In order to decrease the number of times of the control changing to the different frequency, the relation between the judging threshold value Th_Tx_Pow 1 in the inequality (11) and the judging threshold value Th_Tx_Pow 2 in the inequality (12) has the following inequality (13), which has a margin.

$$Th\_Tx\_Pow\ 1 - Th\_Tx\_Pow\ 2 > 0 \qquad (13)$$

At this control of the measurement of the different frequency, in FIG. 3, the measurement of the different frequency is stopped by making the time t2, when the reception quality Q_1 of the broadcast channel of the currently using carrier frequency became larger than the judging threshold value Th_end in the inequality (4), as its starting point. Or the changing over to the different frequency is started and the measurement of the different frequency is stopped at the same time by making the time t4, when the inequality (2) was satisfied, as its starting time. As mentioned above, the judging threshold value Th_end in the inequality (4) is larger than the judging threshold value Th_start in the inequality (3).

At this control method, the time, when the change of the transmission power Delta_Tx_Pow of the individual channel became smaller than the judging threshold value Th_Delta_Tx_Pow, that is, the inequality (7) was satisfied, is made to be the starting time of not measuring the different frequency, and the measurement of the different frequency is not executed for a certain period. This control method has the same concept as mentioned above. In this case, the following replacements are required. That is, the inequality (11) is replaced by the following inequity (14), the inequality

(12) is replaced by the following inequity (15), and the inequality (13) is replaced by the following inequity (16).

$$Tx\_Pow < Th\_Tx\_Pow\ 1 \quad (14)$$

$$Tx\_Pow > Th\_Tx\_Pow\ 2 \quad (15)$$

$$Th\_Tx\_Pow\ 1 - Th\_Tx\_Pow\ 2 < 0 \quad (16)$$

And by making the time, when the inequality (14) was satisfied, as its starting point, the control of the measurement of the different frequency by the transmission power of the individual channel is stopped. And by making the time, when the inequality (15) was satisfied, as its starting point, the control of the measurement of the different frequency by the transmission power of the individual channel is started.

At this time, when the minimum value of the transmission power of the mobile communication terminal is defined as Min_Tx_Pow, the judging threshold value Th_Tx_Pow 1 in the inequality (14) and the judging threshold value Th_Tx_Pow 2 in the inequality (15) satisfy the following inequality (17).

$$Min\_Tx\_Pow < Th\_Tx\_Pow\ 1 < Th\_Tx\_Pow\ 2 \quad (17)$$

In case that a mobile communication terminal has been connected to plural base stations during its hand over, when the measurement of the transmission power of individual channels for the mobile communication terminal is instructed to the plural base stations, this instruction can be made to a base station, which has the best channel condition with the mobile communication terminal, or to the plural base stations.

The main control operation at the second embodiment of the present invention is executed at the controller for changing over to different frequency 606 in the base station controlling apparatus 60 shown in FIG. 9.

Next, referring to the drawings, the control operation at the controller for changing over to different frequency 606 at the second embodiment of the present invention is explained.

Figure 15:
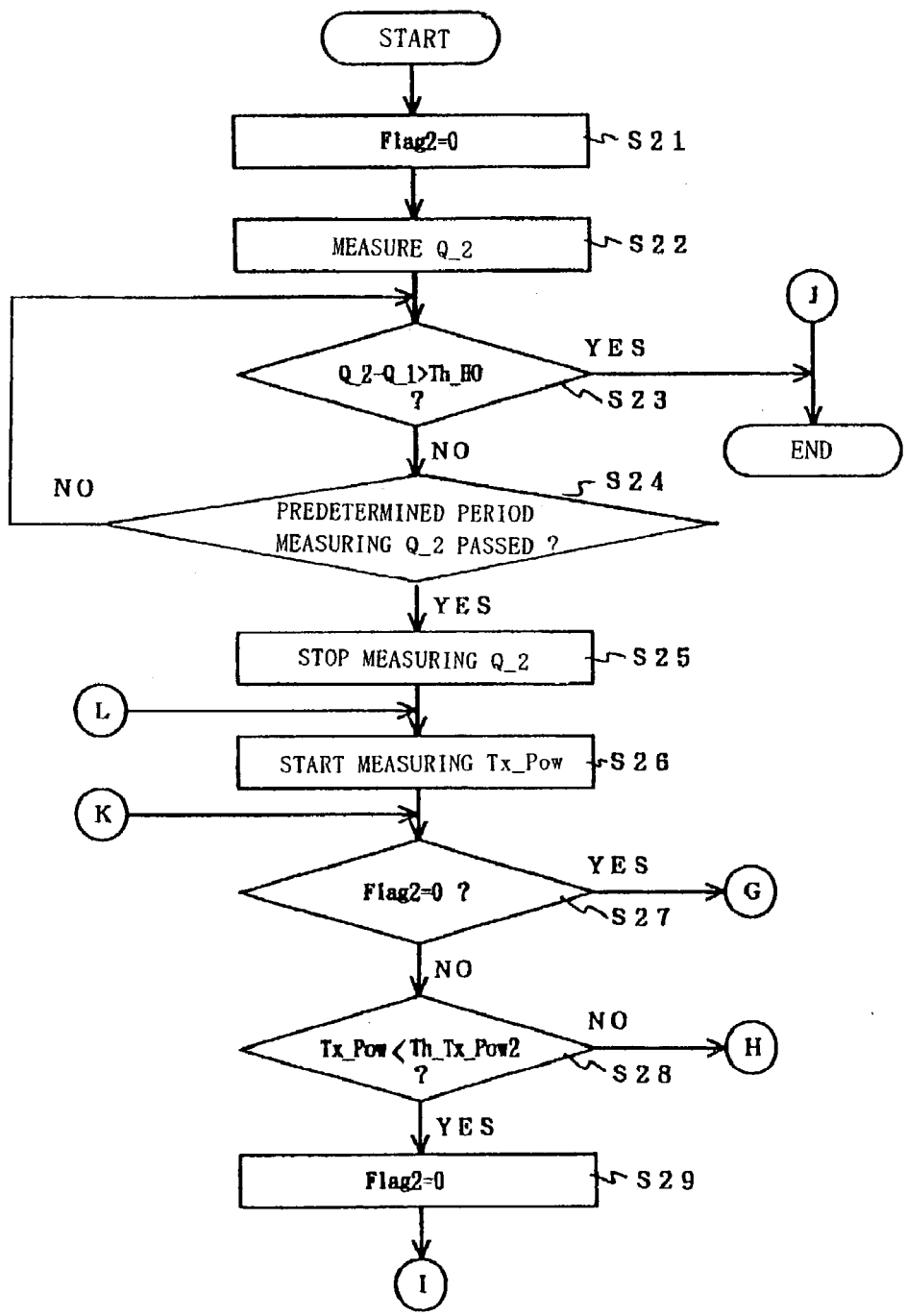
FIG. 15 is a flowchart showing a first part of the control operation at a controller for changing over to different frequency at a second embodiment of the present invention.
Figure 16:
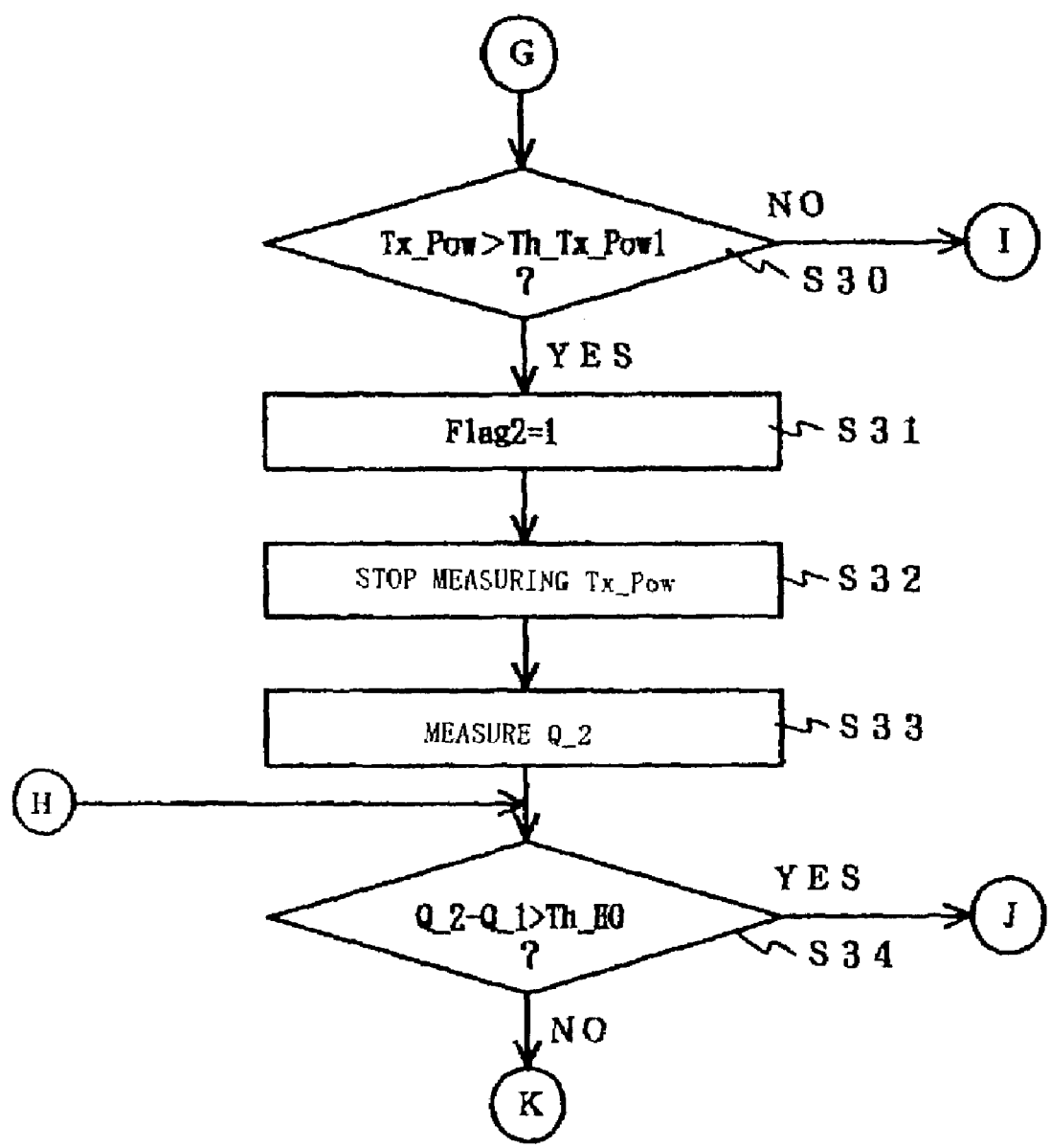
FIG. 16 is a flowchart showing a second part of the control operation at the controller for changing over to different frequency at the second embodiment of the present invention.

FIG. 15 is a flowchart showing a first part of the control operation at the controller for changing over to different frequency 606 at the second embodiment of the present invention. FIG. 16 is a flowchart showing a second part of the control operation at the controller for changing over to different frequency 606 at the second embodiment of the present invention. FIG. 17 is a flowchart showing a third part of the control operation at the controller for changing over to different frequency 606 at the second embodiment of the present invention.

The controller for changing over to different frequency 606 instructs the mobile communication terminal 30 to measure the reception quality Q_1 of the currently using carrier frequency, and receives the measured result. In this case, the start time of the control is the time, in which the inequality (3) was satisfied at the controller for changing over to different frequency 606. And the end time of the control signifies the execution of the changing over to the different frequency.

In the explanation of the control operation of the controller for changing over to different frequency 606 at the second embodiment of the present invention, each of the step numbers is shown in FIGS. 15 to 17.

When the control mentioned above is started, the controller for changing over to different frequency 606 sets the control flag (Flag 2) to be 0 (step S21). And the controller for changing over to different frequency 606 instructs the mobile communication terminal 30 to measure the reception quality Q_2 of the carrier frequency to which the carrier frequency is changed over for a predetermined period T_start, and receives the measured result (step S22).

After this, the controller for changing over to different frequency 606 executes the judgement of the inequality (2) for the reception quality Q_2 of the carrier frequency to which the carrier frequency is changed over and the reception quality Q_1 of the currently using carrier frequency (step S23). When the inequality (2) was satisfied (YES at the step S23), the controller for changing over to different frequency 606 changes over the carrier frequency from the currently using carrier frequency to the different carrier frequency. With this, the control operation at the controller for changing over to different frequency 606 ends.

When the inequality (2) was not satisfied (NO at the step S23), the controller for changing over to different frequency 606 judges whether the predetermined period T_start, for which the reception quality Q_2 of the carrier frequency to which the carrier frequency is changed over is measured, passed or not (step S24). When the condition at the step S24 was not satisfied, the operation returns to the step S23.

When the condition at the step S24 was satisfied, the controller for changing over to different frequency 606 instructs the mobile communication terminal 30 to stop the measurement of the reception quality Q_2 of the carrier frequency to which the carrier frequency is changed over (step S25). After the step S25, the controller for changing over to different frequency 606 instructs the base station 10 to start measuring the transmission power Tx_Pow of the individual channel at the downstream channel for the mobile communication terminal 30 (step S26).

After the step S26, the controller for changing over to different frequency 606 judges whether the control flag (Flag 2) is 0 or not (step S27). When the condition at the step S27 was not satisfied, the controller for changing over to different frequency 606 judges whether the inequality (12) is satisfied or not for the transmission power Tx_Pow of the individual channel at the downstream channel for the mobile communication terminal 30 (step S28).

When the condition at the step S27 was satisfied, the control operation goes to the control operation shown in FIG. 16. And the controller for changing over to different frequency 606 judges whether the inequality (11) is satisfied or not for the transmission power Tx_Pow of the individual channel at the downstream channel for the mobile communication terminal 30 (step S30). When the condition at the step S30 was satisfied, the controller for changing over to different frequency 606 sets the control flag (Flag 2) to be 1 (step S31). After this, the controller for changing over to different frequency 606 instructs the base station 10 to stop measuring the transmission power Tx_Pow of the individual channel at the downstream channel for the mobile communication terminal 30 (step S32).

After the step S32, the controller for changing over to different frequency 606 instructs the mobile communication terminal 30 to measure the reception quality Q_2 of the carrier frequency to which the carrier frequency is changed over, and receives the measured result (step S33). And the controller for changing over to different frequency 606 executes the judgement of the inequality (2) for the reception quality Q_2 of the carrier frequency to which the carrier frequency is changed over and the reception quality Q_1 of the currently using carrier frequency (step S34). When the inequality (2) was satisfied (YES at the step S34), the controller for changing over to different frequency 606 changes over the carrier frequency from the currently using carrier frequency to the different carrier frequency. With this, the control operation at the controller for changing over to different frequency 606 ends. When the inequality (2) was not satisfied (NO at the step S34), the control operation returns to the step S27 in FIG. 15.

When the condition at the step S28 was satisfied, the controller for changing over to different frequency 606 sets the control flag (Flag 2) to be 0 (step S29). And the control operation goes to the control operation shown in FIG. 17. And the judgement at the inequality (6) is executed (step S35). When the condition at the step S35 was not satisfied, the control operation returns to the step S27 shown in FIG. 15. When the condition at the step S35 was satisfied, the controller for changing over to different frequency 606 instructs the base station 10 to stop measuring the transmission power Tx_Pow of the individual channel at the downstream channel for the mobile communication terminal 30 (step S36).

After the step S36, the controller for changing over to different frequency 606 instructs the mobile communication terminal 30 to measure the reception quality Q_2 of the carrier frequency to which the carrier frequency is changed over for a predetermined period T_ob, and receives the measured result (step S37). After the step S37, the controller for changing over to different frequency 606 executes the judgement of the inequality (2) (step S38).

When the inequality (2) was not satisfied (NO at the step S38), the controller for changing over to different frequency 606 judges whether the predetermined time T_ob, for which the reception quality Q_2 of the carrier frequency to which the carrier frequency is changed over is measured, passed or not (step S39). When the condition at the step S39 was satisfied, the operation returns to the step S26 shown in FIG. 15.

When the condition at the step S38 was satisfied (YES at the step S38), the controller for changing over to different frequency 606 changes over the carrier frequency from the currently using carrier frequency to the different carrier frequency. At the control operation mentioned above, when the inequality (4) was satisfied, the control operation at the controller for changing over to different frequency 606 ends.

In case that the mobile communication terminal 30 has been connected to plural base stations 10, 11, 20, and 21 at the same time during its hand over, in FIGS. 15 to 17, when the measurement of the transmission power of individual channels for the mobile communication terminal 30 is instructed to the plural base stations, this instruction can be made to the base station 10, which has the best channel condition with the mobile communication terminal 30, or to the plural base stations 10, 11, 20, and 21.

As mentioned above, at the second embodiment of the present invention, the control of measurement of the different frequency corresponding to the change of the transmission power of the individual channel at the downstream channel is started, at the time when the reception quality of the broadcast channel of the currently using carrier frequency was deteriorated and after this the condition of the inequality (3) was satisfied.

By the control mentioned above, the unnecessary load for the control of the measurement of the different frequency can be decreased at the state in which the reception quality of the broadcast channel of the currently using carrier frequency is good. And in case that the transmission data have been compressed in the time at the time measuring the different frequency, the ratio of the data vacant time to the communication time at measuring the different frequency can be lowered.

Further, as mentioned at the step S35, the judgement of the start and the stop of the control of the measurement of the different frequency is executed corresponding to the change of the transmission power of the individual channel at the downstream channel. By this operation, at the time when the transmission power of the individual channel at the downstream channel was increased, that is, at the time when the channel quality at the downstream channel was deteriorated, the measurement of the different frequency is started and executed for a certain period. With this, the unnecessary measurement of the different frequency is not executed at the time when the channel quality is good, and the power consumption at measuring the different frequency can be decreased.

Further, in case that the transmission data have been compressed in the time at the time measuring the different frequency, the ratio of the data vacant time to the communication time at measuring the different frequency can be lowered.

At the second embodiment of the present invention, the measurement of the different frequency is not executed while the control of the measurement of the different frequency corresponding to the change of the transmission power of the individual channel at the downstream channel is working. And the probability generating the call drop, which occurs at the time when the reception quality of the currently using carrier frequency was deteriorated, is decreased. In order to achieve the operation mentioned above, as mentioned at the step S30, the following control is added. That is, when the transmission power of the individual channel at the downstream channel of the currently using carrier frequency satisfied the inequality (11) at the step S30, the control of the measurement of the different frequency by the change of the transmission power of the individual channel is stopped and the measurement of the different frequency is executed.

That is, at the control operation of the second embodiment of the present invention, in case that the reception quality Q_1 of the currently using carrier frequency is within the first range of the Flag 2=0, when the change of the reception quality Q_1 is larger than the designated value, the reception quality Q_2 of the carrier frequency to which the carrier frequency is changed over is measured. And in case that the reception quality Q_1 of the currently using carrier frequency is without the first range of the Flag 2=0, that is, in the Flag 2=1, the reception quality Q_2 of the carrier frequency to which the carrier frequency is changed over is measured in more frequent times, compared with the case within the first range.

By the control operation mentioned above, at the second embodiment of the present invention, the probability, which achieves the changing over to the different frequency before the call drop occurs, can be made to be high at the small ratio of the data vacant time. Therefore, at the second embodiment of the present invention, the deterioration of the channel quality and the probability generating the call drop phenomenon, caused by the imperfection of the control of the changing over to the different frequency, can be made to be small, and the channel quality can be made to be higher.

Next, a third embodiment of the present invention is explained. At the third embodiment of the present invention, the operation of the controller for changing over to different frequency 606 at the first and the second embodiments is combined.

At the third embodiment of the present invention, the control of the measurement of the different frequency by using the change of the transmission power of the individual channel at the downstream channel is not started at the time when the inequality (8) was satisfied at the control by the first embodiment or at the time when the inequality (11) was satisfied at the control by the second embodiment. After this, the measurement of the different frequency is continued until the inequality (2) was satisfied, or until the inequality (9) was satisfied in case that the time, when the inequality (8) was satisfied, was made to be the starting point, or until the inequality (12) was satisfied in case that the time, when the inequality (11) was satisfied, was made to be the starting point.

At the third embodiment of the present invention, the control of measurement of the different frequency corresponding to the change of the transmission power of the individual channel at the downstream channel is started, at the time when the reception quality of the broadcast channel of the currently using carrier frequency was deteriorated and after this the condition of the inequality (3) was satisfied.

By the control mentioned above, the unnecessary load for the control of the measurement of the different frequency can be decreased at the state in which the reception quality of the broadcast channel of the currently using carrier frequency is good. And in case that the transmission data have been compressed in the time at the time measuring the different frequency, the ratio of the data vacant time to the communication time at measuring the different frequency can be lowered.

Further, as mentioned at the step S15 of the first embodiment and at the step S35 of the second embodiment, the judgement of the start and the stop of the control of the measurement of the different frequency is executed corresponding to the change of the transmission power of the individual channel at the downstream channel. By this operation, at the time when the transmission power of the individual channel at the downstream channel was increased, that is, at the time when the channel quality at the downstream channel was deteriorated, the measurement of the different frequency is started and executed for a certain period. With this, the unnecessary measurement of the different frequency is not executed at the time when the channel quality is good, and the power consumption at measuring the different frequency can be decreased.

Further, in case that the transmission data have been compressed in the time at the time measuring the different frequency, the ratio of the data vacant time to the communication time at measuring the different frequency can be lowered.

At the third embodiment of the present invention, the measurement of the different frequency is not executed while the control of the measurement of the different frequency corresponding to the change of the transmission power of the individual channel at the downstream channel is working. And the probability generating the call drop, which occurs at the time when the reception quality of the currently using carrier frequency was deteriorated, is decreased. In order to achieve the operation mentioned above, as mentioned at the step S10 of the first embodiment, the following control is added. That is, when the reception quality of the broadcast channel of the currently using carrier frequency satisfied the inequality (8), the control of the measurement of the different frequency by the change of the transmission power of the individual channel is stopped and the measurement of the different frequency is executed.

Further, at the third embodiment of the present invention, the measurement of the different frequency is not executed while the control of the measurement of the different frequency corresponding to the change of the transmission power of the individual channel at the downstream channel is working. And the probability generating the call drop, which occurs at the time when the reception quality of the currently using carrier frequency was deteriorated, is decreased. In order to achieve the operation mentioned above, as mentioned at the step S30 of the second embodiment, the following control is added. That is, when the transmission power of the individual channel at the downstream channel of the currently using carrier frequency satisfied the inequality (11), the control of the measurement of the different frequency by the change of the transmission power of the individual channel is stopped and the measurement of the different frequency is executed.

By the control operation mentioned above, at the third embodiment of the present invention, the probability, which achieves the changing over to the different frequency before the call drop occurs, can be made to be high at the small ratio of the data vacant time. Therefore, at the third embodiment of the present invention, the deterioration of the channel quality and the probability generating the call drop phenomenon, caused by the imperfection of the control of the changing over to the different frequency, can be made to be small, and the channel quality can be made to be higher.

Figure 18:
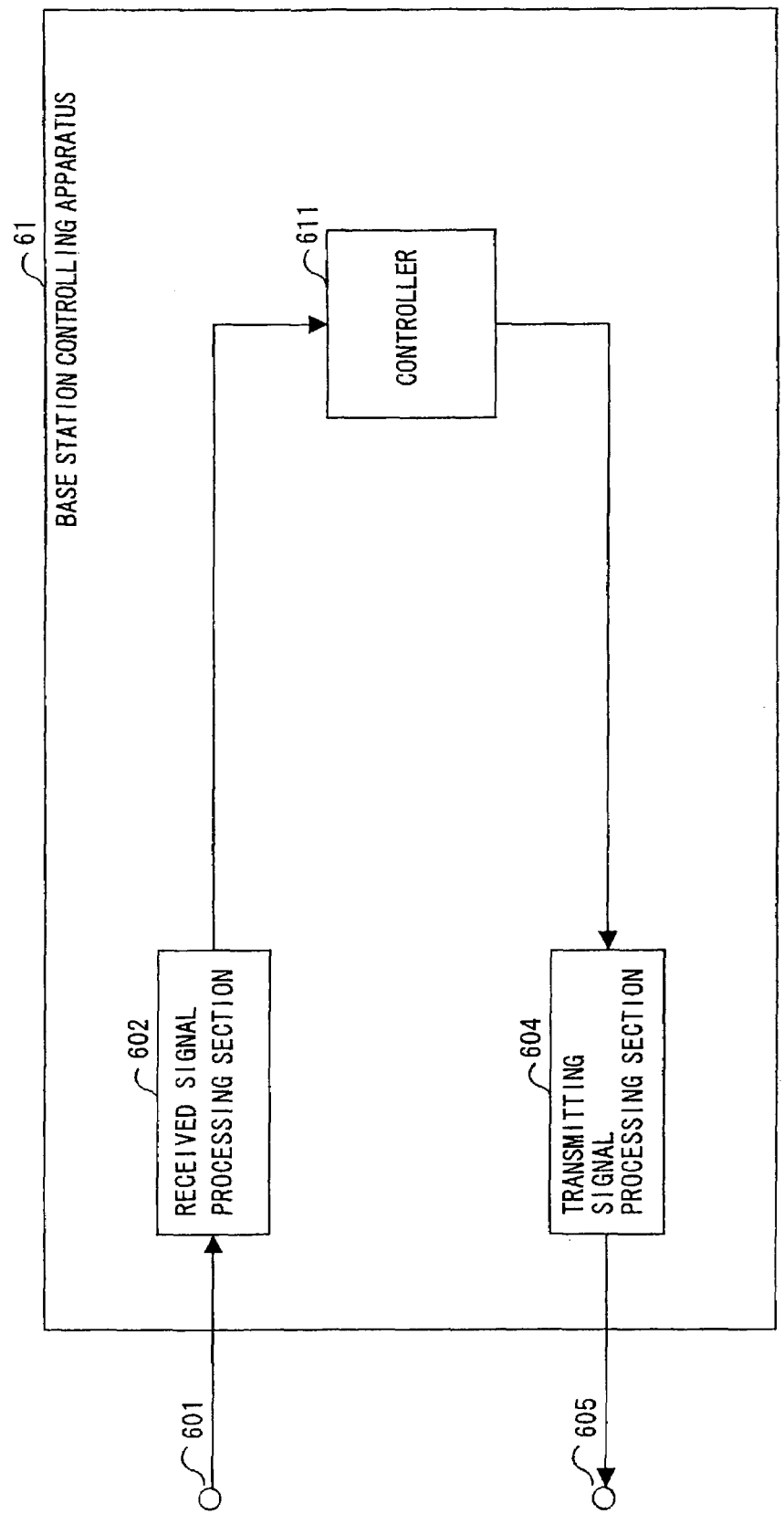
FIG. 18 is a block diagram showing a structure of a base station controlling apparatus at a fourth embodiment of the present invention.

Next, referring to the drawings, a fourth embodiment of the present invention is explained. FIG. 18 is a block diagram showing a structure of a base station controlling apparatus 61 at the fourth embodiment of the present invention. As shown in FIG. 18, the base station controlling apparatus 61 at the fourth embodiment of the present invention provides a controller 611 instead of the controller 603 and the controller for changing over to different frequency 606 at the base station controlling apparatus 60 of the first embodiment of the present invention.

At the fourth embodiment of the present invention, each of the other sections in the base station controlling apparatus 61 is the same at the first embodiment and has the same reference number at the first embodiment of the present invention. Further, the operation of each of the other sections is the same at the first embodiment.

That is, the base station controlling apparatus 61 provides an input terminal 601, a received signal processing section 602, the controller 611, a transmitting signal processing section 604, and an output terminal 605.

The input terminal 601 receives signals from one or plural base stations 10, 11, 20, and 21. The received signal processing section 602 processes the received signals inputted from the input terminal 601. The controller 611 executes control based on control signals from mobile communication terminals and the base stations 10, 11, 20, and 21. The transmitting signal processing section 604 processes signals to be transmitted. The output terminal 605 transmits signals to one or plural base stations 10, 11, 20, and 21.

The controller 611 executes the control of the channel setting between the mobile communication terminals and the base stations 10, 11, 20, and 21. Further, the controller 611 receives control signals, which request to change over to a different frequency, from the mobile communication terminals, and controls so that the base stations 10, 11, 20, and 21 which have been connected to the mobile communication terminals change over to the different frequency.

Further, the controller 611 receives control signals, which request to change over to the different frequency, from the mobile communication terminals, and controls so that the base stations 10, 11, 20, and 21 which have been connected to the mobile communication terminals make the data vacant time of individual channels. The controller 611 measures the transmission power of the base stations 10, 11, 20, and 21, based on the control signals of the mobile communication terminals. And the controller 611 controls to transmit the measured results to the mobile communication terminals.

Figure 19:
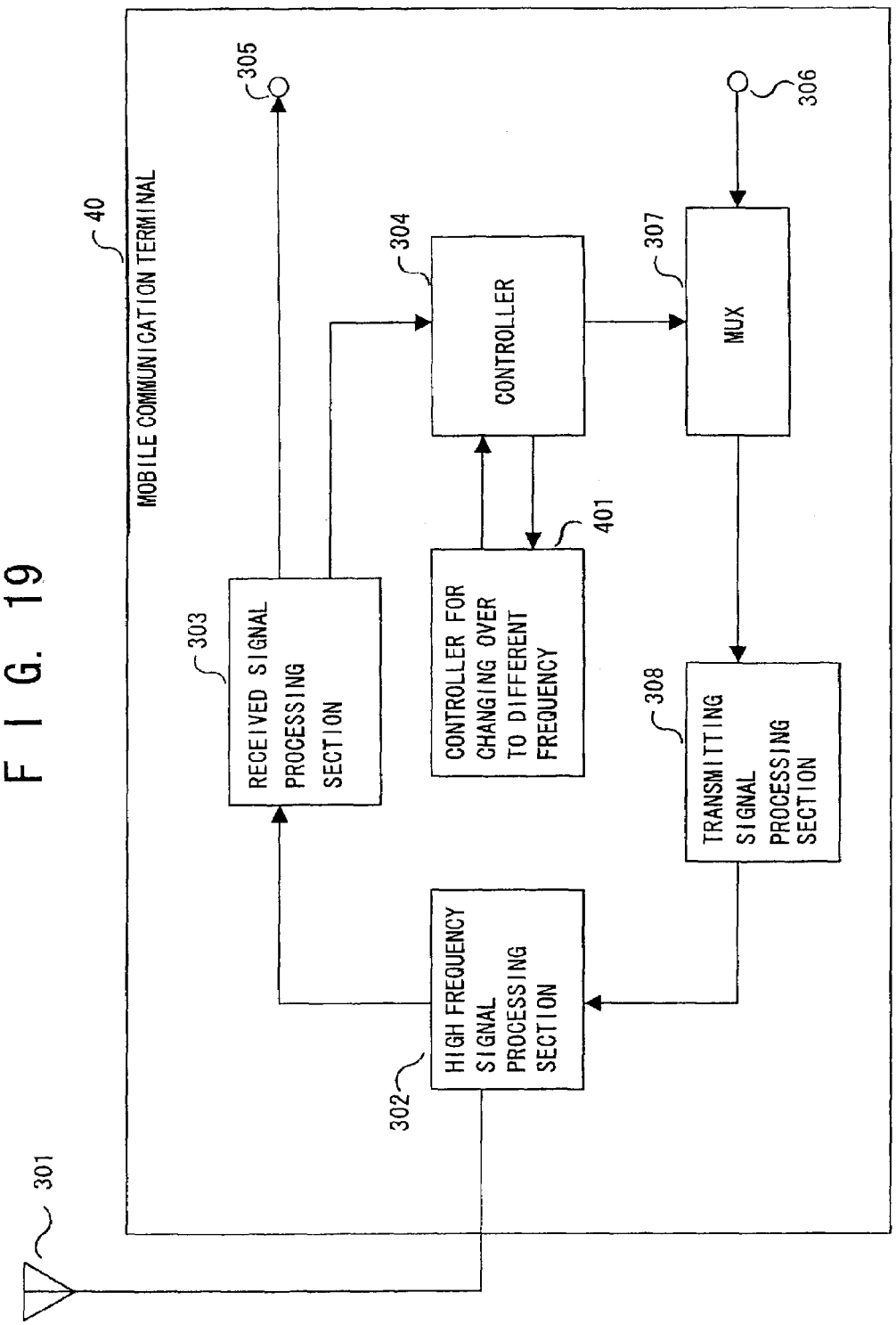
FIG. 19 is a block diagram showing a structure of a mobile communication terminal at the fourth embodiment of the present invention.

FIG. 19 is a block diagram showing a structure of a mobile communication terminal 40 at the fourth embodiment of the present invention. As shown in FIG. 19, the mobile communication terminal 40 at the fourth embodiment of the present invention newly provides a controller for changing over to different frequency 401, compared with the mobile communication terminal 30 at the first embodiment of the present invention shown in FIG. 11.

At the fourth embodiment of the present invention, each of the other sections in the mobile communication terminal 40 is the same at the first embodiment and has the same reference number at the first embodiment of the present invention. Further, the operation of each of the other sections is the same at the first embodiment.

That is, the mobile communication terminal 40 provides an antenna 301, a high frequency signal processing section 302, a received signal processing section 303, a controller 304, an output terminal 305, an input terminal 306, a multiplexer (MUX) 307, a transmitting signal processing section 308, and the controller for changing over to different frequency 401.

The antenna 301 receives signals from one or plural base stations 10, 11, 20, and 21, and transmits signals to one or plural base stations 10, 11, 20, and 21. The high frequency signal processing section 302 processes received high frequency signals and also processes transmitting high frequency signals. The received signal processing section 303 processes the received signals. The controller 304 executes control based on control signals from the received signal processing section 303. The output terminal 305 outputs received data. The input terminal 306 receives data to be transmitted. The MUX 307 multiplexes the data to be transmitted inputted from the input terminal 306 and control signals from the controller 304. The transmitting signal processing section 308 processes the data multiplexed at the MUX 307.

The controller 304 cyclically measures a broadcast channel transmitted from, for example, the base station 10, received at the received signal processing section 303, and processes the information of the measured result for transmitting to the base station controlling apparatus 61. And the controller 304 measures the reception quality based on the signal from the received signal processing section 303, and generates transmission power control signals for one or plural base stations 10, 11, 20, and 21. The controller 304 controls the transmission power based on the received control signals from one or plural base stations 10, 11, 20, and 21.

The controller for changing over to different frequency 401 in the mobile communication terminal 40 cyclically measures the broadcast channel transmitted from the base station 10, and judges the control of changing over to the different frequency and the control of measuring the different frequency, based on the measured results. Further, the controller for changing over to different frequency 401 receives the measured results of the transmission power from the base station 10 and judges the control of changing over to the different frequency and the control of measuring the different frequency, based on the measure results.

The main control operation at the fourth embodiment of the present invention is executed at the controller for changing over to different frequency 401 in the mobile communication terminal 40. That is, at the first embodiment, the judgement changing over to the different frequency is executed at the controller for changing over to different frequency 606 in the base station controlling apparatus 60. However, at the fourth embodiment, the judgement changing over to the different frequency is executed at the controller for changing over to different frequency 401 in the mobile communication terminal 40.

The control operation at the fourth embodiment is almost equal to that at the first embodiment. Therefore, at the fourth embodiment of the present invention, the probability, which achieves the changing over to the different frequency before the call drop occurs, can be made to be high at the small ratio of the data vacant time. Consequently, at the fourth embodiment of the present invention, the deterioration of the channel quality and the probability generating the call drop phenomenon, caused by the imperfection of the control of the changing over to the different frequency, can be made to be small, and the channel quality can be made to be higher.

Next, a fifth embodiment of the present invention is explained. The structure at the fifth embodiment of the present invention is the same at the fourth embodiment. That is, the structures of the base station controlling apparatus and the mobile communication terminals are the same at the fourth embodiment, and the main operation is executed at the controller for changing over to different frequency 401 in the mobile communication terminal 40. However, the control method is almost equal to that at the second embodiment.

That is, the judgement of the control of changing over to the different frequency is executed at the controller for changing over to different frequency 401 in the mobile communication terminal 40 at the fifth embodiment, instead of at the controller for changing over to different frequency 606 in the base station controlling apparatus 60 at the second embodiment.

Therefore, at the fifth embodiment of the present invention, the probability, which achieves the changing over to the different frequency before the call drop occurs, can be made to be high at the small ratio of the data vacant time. Consequently, at the fifth embodiment of the present invention, the deterioration of the channel quality and the probability generating the call drop phenomenon, caused by the imperfection of the control of the changing over to the different frequency, can be made to be small, and the channel quality can be made to be higher.

Next, a sixth embodiment of the present invention is explained. The structure at the sixth embodiment of the present invention is the same at the fourth embodiment. That is, the structures of the base station controlling apparatus and the mobile communication terminals are the same at the fourth embodiment, and the main operation is executed at the controller for changing over to different frequency 401 in the mobile communication terminal 40. And the control method is almost equal to that at the third embodiment.

That is, the judgement of the control of changing over to the different frequency is executed at the controller for changing over to different frequency 401 in the mobile communication terminal 40 at the sixth embodiment, instead of at the controller for changing over to different frequency 606 in the base station controlling apparatus 60 at the third embodiment.

Therefore, at the sixth embodiment of the present invention, the probability, which achieves the changing over to the different frequency before the call drop occurs, can be made to be high at the small ratio of the data vacant time. Consequently, at the sixth embodiment of the present invention, the deterioration of the channel quality and the probability generating the call drop phenomenon, caused by the imperfection of the control of the changing over to the different frequency, can be made to be small, and the channel quality can be made to be higher.

Figure 20:
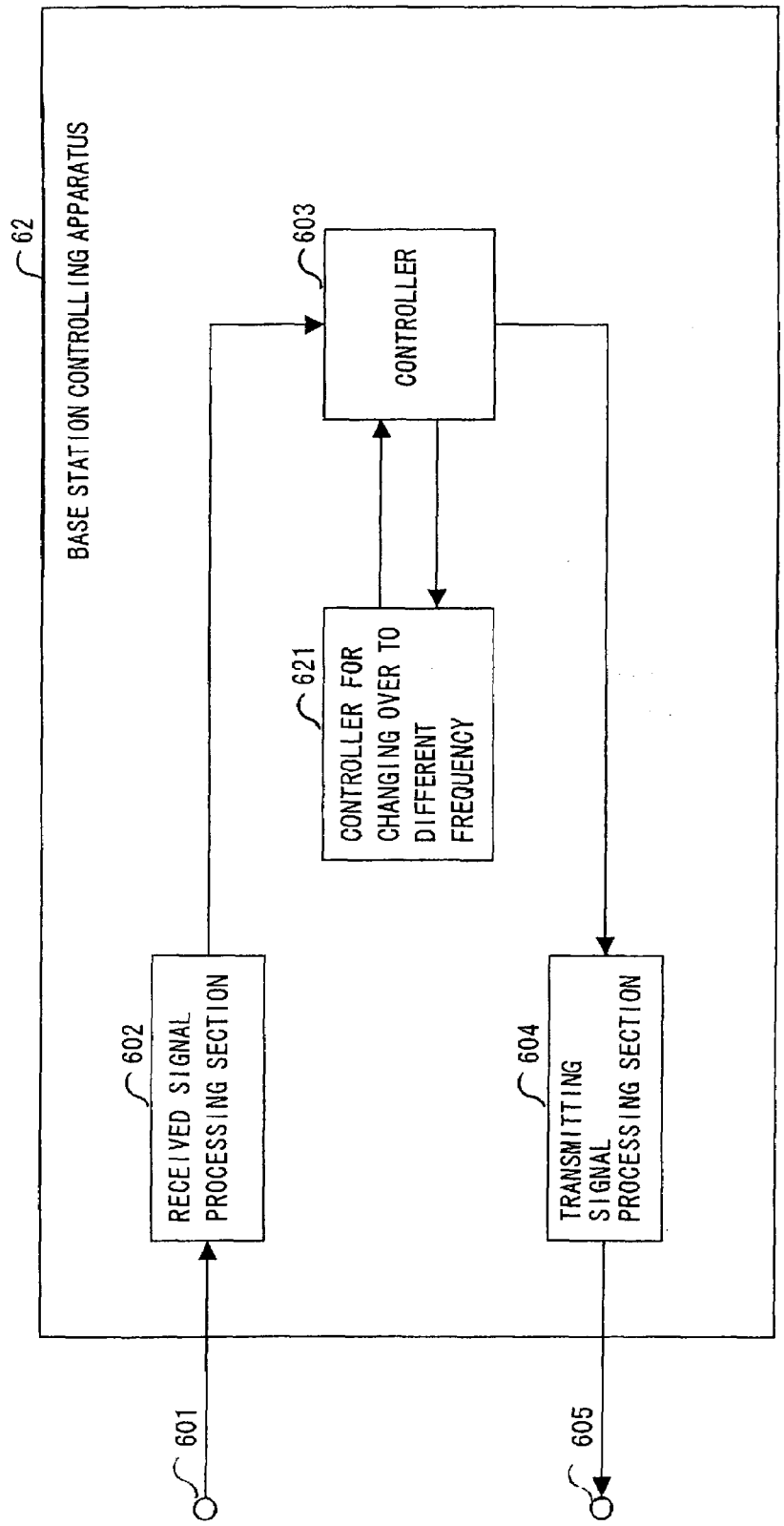
FIG. 20 is a block diagram showing a structure of a base station controlling apparatus at a seventh embodiment of the present invention.

Next, referring to the drawings, a seventh embodiment of the present invention is explained. FIG. 20 is a block diagram showing a structure of a base station controlling apparatus 62 at the seventh embodiment of the present invention. As shown in FIG. 20, the base station controlling apparatus 62 at the seventh embodiment of the present invention provides a controller for changing over to different frequency 621 instead of the controller for changing over to different frequency 606 in the base station controlling apparatus 60 of the first embodiment of the present invention. The controller for changing over to different frequency 621 executes the control changing over to the different frequency based on the measured result of the transmission power of the individual channel at the upstream channel. That is, at the seventh embodiment, the control operation is executed by the measured result of the transmission power of the individual channel at the upstream channel instead of at the downstream channel.

At the seventh embodiment of the present invention, each of the other sections in the base station controlling apparatus 62 is the same at the base station controlling apparatus 60 of the first embodiment and has the same reference number at the first embodiment of the present invention. Further, the operation of each of the other sections in the base station controlling apparatus 62 is the same at the first embodiment.

That is, as shown in FIG. 20, the base station controlling apparatus 62 provides an input terminal 601, a received signal processing section 602, a controller 603, a transmitting signal processing section 604, an output terminal 605, and the controller for changing over to different frequency 621.

The input terminal 601 receives signals from one or plural base stations 10, 11, 20, and 21. The received signal processing section 602 processes the received signals inputted from the input terminal 601. The controller 603 executes control based on control signals from the mobile communication terminals and the base stations 10, 11, 20, and 21. The transmitting signal processing section 604 processes signals to be transmitted. The output terminal 605 transmits signals to one or plural base stations 10, 11, 20, and 21.

The controller 603 executes the control of the channel setting between the mobile communication terminals and the base stations 10, 11, 20, and 21. The controller for changing over to different frequency 621 receives control signals, which request to change over to a different frequency form the mobile communication terminals and controls to make the data vacant time of the individual channels and to change over to the different frequency for the base stations 10, 11, 20, and 21, which are connecting to the mobile communication terminals. The controller for changing over to different frequency 621 controls the measurement of the transmission power of the mobile communication terminals, and judges the measurement of the different frequency based on the measured results from the mobile communication terminals.

Figure 21:
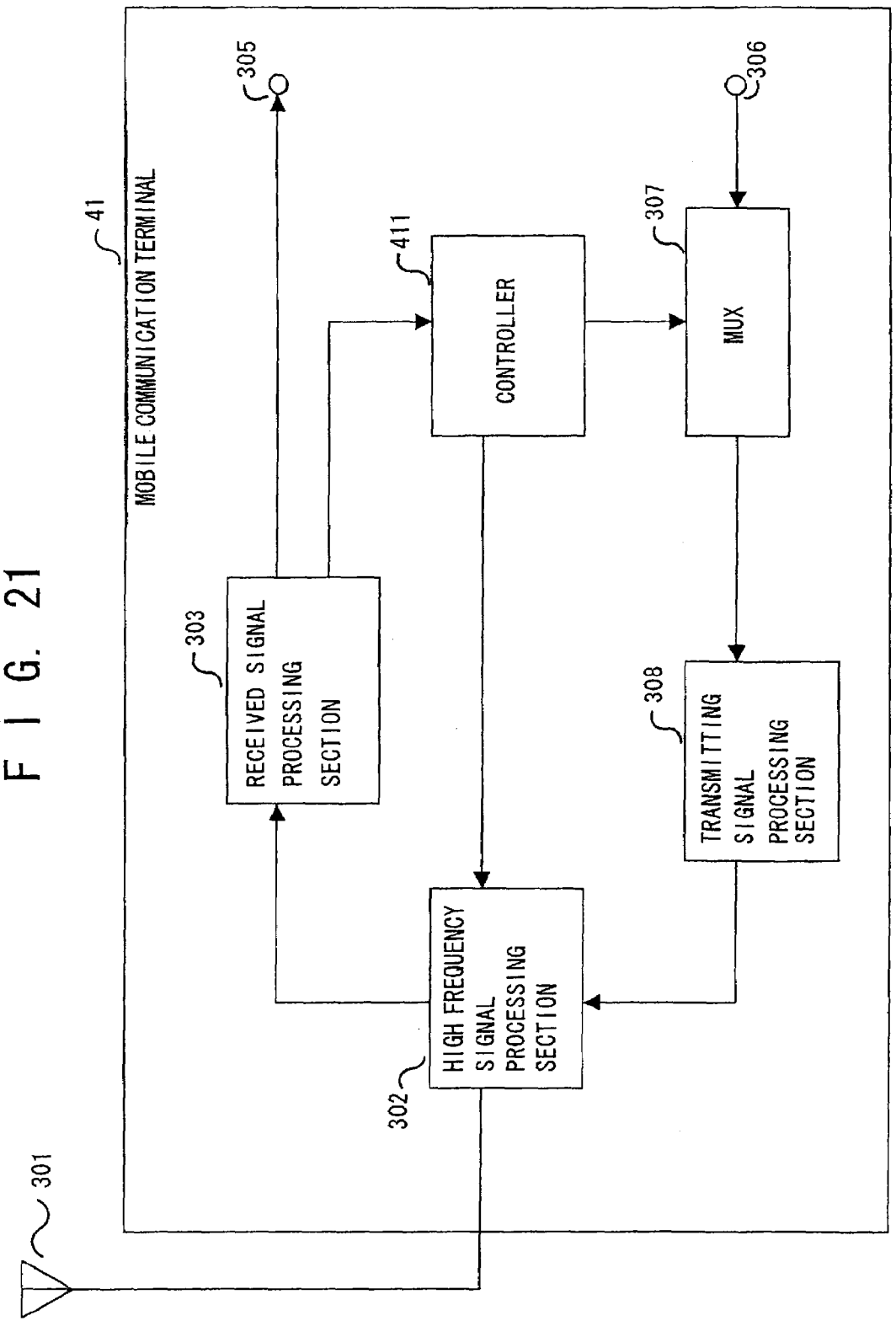
FIG. 21 is a block diagram showing a structure of a mobile communication terminal at the seventh embodiment of the present invention.

FIG. 21 is a block diagram showing a structure of a mobile communication terminal 41 at the seventh embodiment of the present invention. As shown in FIG. 21, the mobile communication terminal 41 at the seventh embodiment of the present invention provides a controller 411 instead of the controller 304 in the mobile communication terminal 30 of the first embodiment of the present invention. The controller 411 executes the control measuring the different frequency based on the measured result of the transmission power of the individual channel at the upstream channel.

At the seventh embodiment of the present invention, each of the other sections in the mobile communication terminal 41 is the same at the first embodiment and has the same reference number at the first embodiment of the present invention. Further, the operation of each of the other sections is the same at the first embodiment.

That is, the mobile communication terminal 41 provides an antenna 301, a high frequency signal processing section 302, a received signal processing section 303, an output terminal 305, an input terminal 306, a multiplexer (MUX) 307, a transmitting signal processing section 308, and the controller 411.

The antenna 301 receives signals from one or plural base stations 10, 11, 20, and 21, and transmits signals to one or plural base stations 10, 11, 20, and 21. The high frequency signal processing section 302 processes received high frequency signals and also processes transmitting high frequency signals. The received signal processing section 303 processes the received signals. The controller 411 executes control based on control signals from the received signal processing section 303. The output terminal 305 outputs received data. The input terminal 306 receives data to be transmitted. The MUX 307 multiplexes the data to be transmitted inputted from the input terminal 306 and control signals from the controller 411. The transmitting signal processing section 308 processes the data multiplexed at the MUX 307.

The controller 411 cyclically measures broadcast channels transmitted from the base stations 10, 11, 20, and 21, received at the received signal processing section 303, and processes the measured results for informing to the base stations 10, 11, 20, and 21. Further, the controller 411 cyclically measures the broadcast channels transmitted from the base stations 10, 11, 20, and 21 based on the signals received at the received signal processing section 303, and processes the information of the measured results for transmitting to the base station controlling apparatus 62.

The controller 411 measures the reception quality based on the signals from the received signal processing section 303, and generates transmission power control signals for one or plural base stations 10, 11, 20, and 21. The controller 411 controls the transmission power based on the received control signals from one or plural base stations 10, 11, 20, and 21. The controller 411 receives the instruction of the measurement of the transmission power of its own terminal (mobile communication terminal 41) from the base station controlling apparatus 62, and informs the base station controlling apparatus 62 about the measured result of the transmission power of the mobile communication terminal 41 based on this instruction.

At the first embodiment of the present invention, the control of the measurement of the different frequency is executed by measured results of the transmission power of the individual channel at the downstream channel. However, at the seventh embodiment of the present invention, the control of the measurement of the different frequency is executed by measured results of the transmission power of the individual channel at the upstream channel. In order to achieve this, the base station controlling apparatus 62 is used at the seventh embodiment instead of the base station controlling apparatus 60, and the controller for changing over to different frequency 621 is used at the seventh embodiment instead of the controller for changing over to different frequency 606. Further, the mobile communication terminal 41 is used at the seventh embodiment instead of the mobile communication terminal 30 and the controller 411 is used instead of the controller 304.

By the structures mentioned above, at the seventh embodiment of the present invention, at the time when the reception quality of the broadcast channel of the currently using carrier frequency was deteriorated and after this the inequality (3) was satisfied, the control measuring the different frequency corresponding to the change of the transmission power of the individual channel at the upstream channel is started.

By the control mentioned above, at the seventh embodiment of the present invention, the unnecessary load for the control of the measurement of the different frequency can be decreased at the state in which the reception quality of the broadcast channel of the currently using carrier frequency is good. And at the seventh embodiment, in case that the transmission data have been compressed in the time at the time measuring the different frequency, the ratio of the data vacant time to the communication time at measuring the different frequency can be lowered.

At the seventh embodiment of the present invention, as mentioned at the step S15 of the first embodiment of the present invention, the judgement of the start and the stop of the control of the measurement of the different frequency is executed corresponding to the change of the transmission power of the individual channel at the upstream channel instead of at the downstream channel. By this operation, at the time when the transmission power of the individual channel at the upstream channel was increased, that is, at the time when the channel quality at the upstream channel was deteriorated, the measurement of the different frequency is started and executed for a certain period. With this, the unnecessary measurement of the different frequency is not executed at the time when the channel quality is good, and the power consumption at measuring the different frequency can be decreased.

And at the seventh embodiment of the present invention, in case that the transmission data have been compressed in the time at the time measuring the different frequency, the ratio of the data vacant time to the communication time at measuring the different frequency can be lowered.

Further, at the seventh embodiment of the present invention, the measurement of the different frequency is not executed while the control of the measurement of the different frequency corresponding to the change of the transmission power of the individual channel at the upstream channel is working. And the probability generating the call drop, which occurs at the time when the reception quality of the currently using carrier frequency was deteriorated, is decreased. In order to achieve the operation mentioned above, as mentioned at the step S10 of the first embodiment, the following control is added. That is, when the reception quality of the broadcast channel of the currently using carrier frequency satisfied the inequality (8), the control of the measurement of the different frequency by the change of the transmission power of the individual channel is stopped and the measurement of the different frequency is executed.

By the control operation mentioned above, at the seventh embodiment of the present invention, the probability, which achieves the changing over to the different frequency before the call drop occurs, can be made to be high at the small ratio of the data vacant time. Therefore, at the seventh embodiment of the present invention, the deterioration of the channel quality and the probability generating the call drop phenomenon, caused by the imperfection of the control of the changing over to the different frequency, can be made to be small, and the channel quality can be made to be higher.

Next, an eighth embodiment of the present invention is explained. The structure at the eighth embodiment of the present invention is the same at the seventh embodiment. That is, the structures of the base station controlling apparatus and the mobile communication terminals are the same at the seventh embodiment, and the main operation is executed at the controller for changing over to different frequency 621 in the base station controlling apparatus 62. And the control method is almost equal to that at the second embodiment.

At the second embodiment of the present invention, the control of the measurement of the different frequency is executed by measured results of the transmission power of the individual channel at the downstream channel. However, at the eighth embodiment of the present invention, the control of the measurement of the different frequency is executed by measured results of the transmission power of the individual channel at the upstream channel. In order to achieve this, the base station controlling apparatus 62 is used at the eighth embodiment instead of the base station controlling apparatus 60, and the controller for changing over to different frequency 621 is used at the eighth embodiment instead of the controller for changing over to different frequency 606. And the mobile communication terminal 41 is used at the eighth embodiment instead of the mobile communication terminal 30 and the controller 411 is used instead of the controller 304.

By the structures mentioned above, at the eighth embodiment of the present invention, at the time when the reception quality of the broadcast channel of the currently using carrier frequency was deteriorated and after this the inequality (3) was satisfied, the control measuring the different frequency corresponding to the change of the transmission power of the individual channel at the upstream channel is started.

By the control mentioned above, at the eighth embodiment of the present invention, the unnecessary load for the control of the measurement of the different frequency can be decreased at the state in which the reception quality of the broadcast channel of the currently using carrier frequency is good.

At the eighth embodiment of the present invention, as mentioned at the step S35 of the second embodiment of the present invention, the judgement of the start and the stop of the control of the measurement of the different frequency is executed corresponding to the change of the transmission power of the individual channel at the upstream channel instead of at the downstream channel. By this operation, at the time when the transmission power of the individual channel at the upstream channel was increased, that is, at the time when the channel quality at the upstream channel was deteriorated, the measurement of the different frequency is started and executed for a certain period. With this, the unnecessary measurement of the different frequency is not executed at the time when the channel quality is good, and the power consumption at measuring the different frequency can be decreased.

And at the eighth embodiment, in case that the transmission data have been compressed in the time at the time measuring the different frequency, the ratio of the data vacant time to the communication time at measuring the different frequency can be lowered.

Further, at the eighth embodiment of the present invention, the measurement of the different frequency is not executed while the control of the measurement of the different frequency corresponding to the change of the transmission power of the individual channel at the upstream channel is working. And the probability generating the call drop, which occurs at the time when the reception quality of the currently using carrier frequency was deteriorated, is decreased. In order to achieve the operation mentioned above, as mentioned at the step S30 of the second embodiment, the following control is added. That is, when the transmission power of the individual channel at the upstream channel of the currently using carrier frequency satisfied the inequality (11), the control of the measurement of the different frequency by the change of the transmission power of the individual channel is stopped and the measurement of the different frequency is executed.

By the control operation mentioned above, at the eighth embodiment of the present invention, the probability, which achieves the changing over to the different frequency before the call drop occurs, can be made to be high at the small ratio of the data vacant time. Therefore, at the eighth embodiment of the present invention, the deterioration of the channel quality and the probability generating the call drop phenomenon, caused by the imperfection of the control of the changing over to the different frequency, can be made to be small, and the channel quality can be made to be higher.

Next, a ninth embodiment of the present invention is explained. The structure at the ninth embodiment of the present invention is the same at the seventh embodiment. That is, the structures of the base station controlling apparatus and the mobile communication terminals are the same at the seventh embodiment, and the main operation is executed at the controller for changing over to different frequency 621 in the base station controlling apparatus 62. And the control method is almost equal to that at the third embodiment.

At the third embodiment of the present invention, the control of the measurement of the different frequency is executed by measured results of the transmission power of the individual channel at the downstream channel. However, at the ninth embodiment of the present invention, the control of the measurement of the different frequency is executed by measured results of the transmission power of the individual channel at the upstream channel. In order to achieve this, the base station controlling apparatus 62 is used at the ninth embodiment instead of the base station controlling apparatus 60, and the controller for changing over to different frequency 621 is used at the ninth embodiment instead of the controller for changing over to different frequency 606. And the mobile communication terminal 41 is used at the ninth embodiment instead of the mobile communication terminal 30 and the controller 411 is used instead of the controller 304.

By the structures mentioned above, at the ninth embodiment of the present invention, at the time when the reception quality of the broadcast channel of the currently using carrier frequency was deteriorated and after this the inequality (3) was satisfied, the control measuring the different frequency corresponding to the change of the transmission power of the individual channel at the upstream channel is started.

By the control mentioned above, at the ninth embodiment of the present invention, the unnecessary load for the control of the measurement of the different frequency can be decreased at the state in which the reception quality of the broadcast channel of the currently using carrier frequency is good.

At the ninth embodiment of the present invention, as mentioned at the step S15 of the first embodiment of the present invention and at the step S35 of the second embodiment of the present invention, the judgement of the start and the stop of the control of the measurement of the different frequency is executed corresponding to the change of the transmission power of the individual channel at the upstream channel instead of at the downstream channel. By this operation, at the time when the transmission power of the individual channel at the upstream channel was increased, that is, at the time when the channel quality at the upstream channel was deteriorated, the measurement of the different frequency is started and executed for a certain period. With this, the unnecessary measurement of the different frequency is not executed at the time when the channel quality is good, and the power consumption at measuring the different frequency can be decreased.

And at the ninth embodiment of the present invention, in case that the transmission data have been compressed in the time at the time measuring the different frequency, the ratio of the data vacant time to the communication time at measuring the different frequency can be lowered.

Further, at the ninth embodiment of the present invention, the measurement of the different frequency is not executed while the control of the measurement of the different frequency corresponding to the change of the transmission power of the individual channel at the upstream channel is working. And the probability generating the call drop, which occurs at the time when the reception quality of the currently using carrier frequency was deteriorated, is decreased. In order to achieve the operation mentioned above, as mentioned at the step S10 of the first embodiment, the following control is added. That is, when the reception quality of the broadcast channel of the currently using carrier frequency satisfied the inequality (8), the control of the measurement of the different frequency by the change of the transmission power of the individual channel is stopped and the measurement of the different frequency is executed.

And, at the ninth embodiment of the present invention, the measurement of the different frequency is not executed while the control of the measurement of the different frequency corresponding to the change of the transmission power of the individual channel at the upstream channel is working. And the probability generating the call drop, which occurs at the time when the reception quality of the currently using carrier frequency was deteriorated, is decreased. In order to achieve the operation mentioned above, as mentioned at the step S30 of the second embodiment, the following control is added. That is, when the transmission power of the individual channel at the upstream channel of the currently using carrier frequency satisfied the inequality (11), the control of the measurement of the different frequency by the change of the transmission power of the individual channel is stopped and the measurement of the different frequency is executed.

By the control operation mentioned above, at the ninth embodiment of the present invention, the probability, which achieves the changing over to the different frequency before the call drop occurs, can be made to be high at the small ratio of the data vacant time. Therefore, at the ninth embodiment of the present invention, the deterioration of the channel quality and the probability generating the call drop phenomenon, caused by the imperfection of the control of the changing over to the different frequency, can be made to be small, and the channel quality can be made to be higher.

Figure 22:
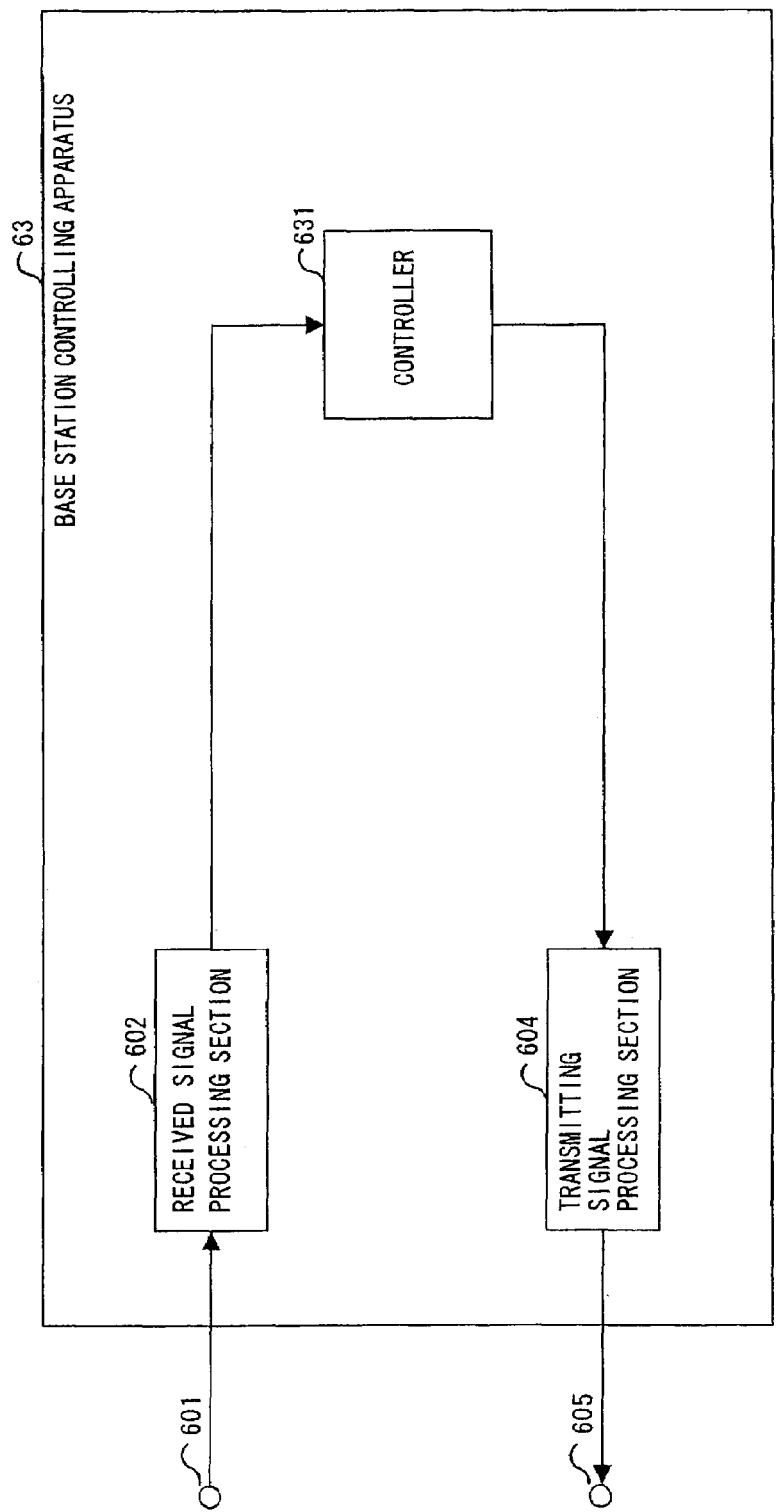
FIG. 22 is a block diagram showing a structure of a base station controlling apparatus at a tenth embodiment of the present invention.

Next, referring to the drawings, a tenth embodiment of the present invention is explained. FIG. 22 is a block diagram showing a structure of a base station controlling apparatus 63 at the tenth embodiment of the present invention. As shown in FIG. 22, the base station controlling apparatus 63 at the tenth embodiment of the present invention provides a controller 631 instead of the controller 603 and the controller for changing over to different frequency 606 at the base station controlling apparatus 60 of the first embodiment of the present invention.

At the tenth embodiment of the present invention, each of the other sections in the base station controlling apparatus 63 is the same at the first embodiment and has the same reference number at the first embodiment of the present invention. Further, the operation of each of the other sections is the same at the first embodiment.

That is, the base station controlling apparatus 63 provides an input terminal 601, a received signal processing section 602, a transmitting signal processing section 604, an output terminal 605, and the controller 631.

The input terminal 601 receives signals from one or plural base stations 10, 11, 20, and 21. The received signal processing section 602 processes the received signals inputted from the input terminal 601. The controller 631 executes control based on control signals from the mobile communication terminals and base stations 10, 11, 20, and 21. The transmitting signal processing section 604 processes signals to be transmitted. The output terminal 605 transmits signals to one or plural base stations 10, 11, 20, and 21.

The controller 631 executes the control of the channel setting between the mobile communication terminals and the base stations 10, 11, 20, and 21. Further, the controller 631 receives control signals, which request to change over to a different frequency, from the mobile communication terminals and controls so that the base stations 10, 11, 20, and 21 which have been connected to the mobile communication terminals change over to the different frequency. And also the controller 631 receives control signals, which request to change over to the different frequency, from the mobile communication terminals and controls so that the base stations 10, 11, 20, and 21 which have been connected to the mobile communication terminals make the data vacant time of individual channels.

Figure 23:
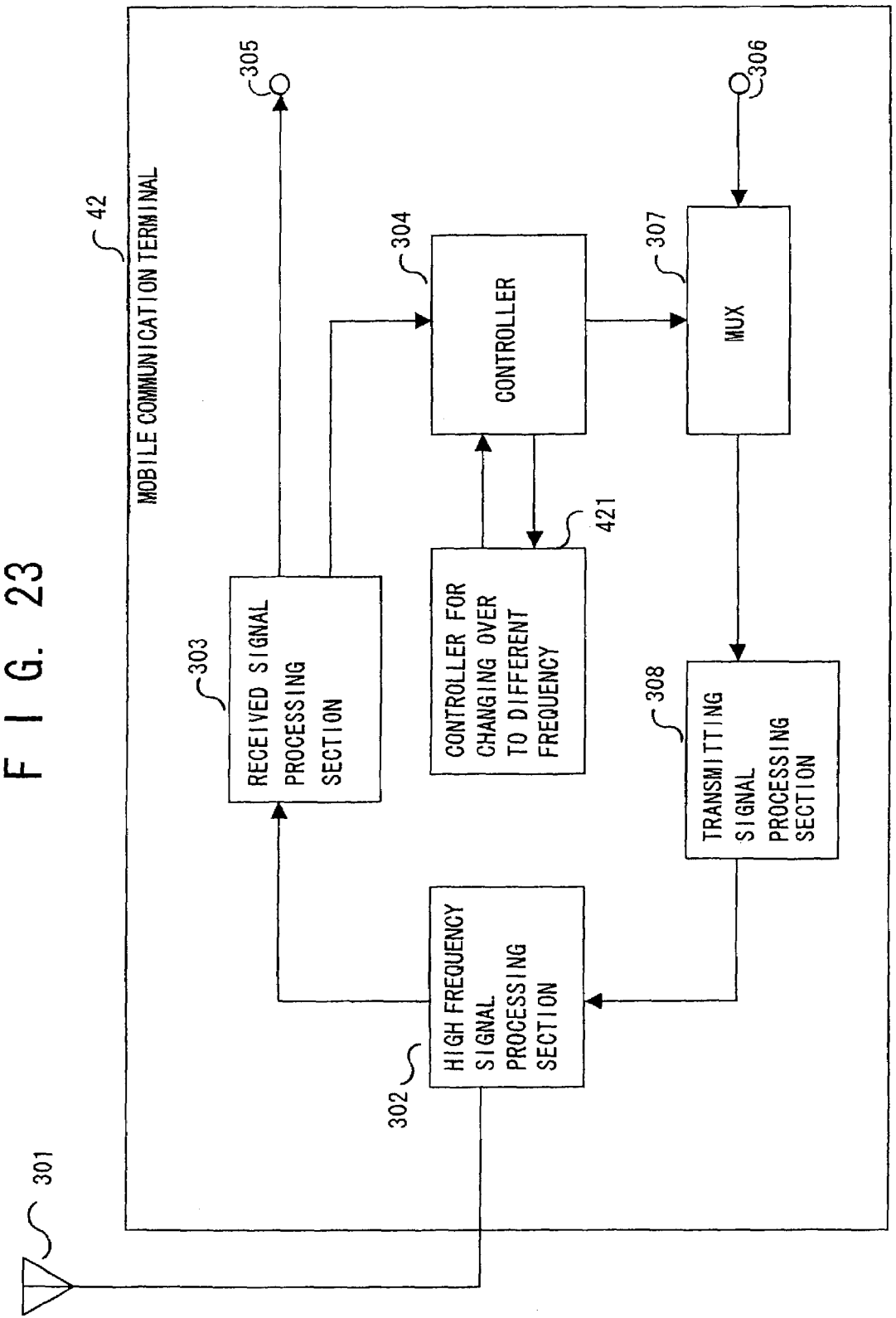
FIG. 23 is a block diagram showing a structure of a mobile communication terminal at the tenth embodiment of the present invention.

FIG. 23 is a block diagram showing a structure of a mobile communication terminal 42 at the tenth embodiment of the present invention. As shown in FIG. 23, the mobile communication terminal 42 at the tenth embodiment of the present invention provides a controller for changing over to different frequency 421, compared with the mobile communication terminal 30 at the first embodiment of the present invention shown in FIG. 11.

At the tenth embodiment of the present invention, each of the other sections in the mobile communication terminal 42 is the same at the first embodiment and has the same reference number at the first embodiment of the present invention. Further, the operation of each of the other sections is the same at the first embodiment.

That is, the mobile communication terminal 42 provides an antenna 301, a high frequency signal processing section 302, a received signal processing section 303, a controller 304, an output terminal 305, an input terminal 306, a multiplexer (MUX) 307, a transmitting signal processing section 308, and the controller for changing over to different frequency 421.

The antenna 301 receives signals from one or plural base stations 10, 11, 20, and 21, and transmits signals to one or plural base stations 10, 11, 20, and 21. The high frequency signal processing section 302 processes received high frequency signals and also processes transmitting high frequency signals. The received signal processing section 303 processes the received signals. The controller 304 executes control based on control signals from the received signal processing section 303. The output terminal 305 outputs received data. The input terminal 306 receives data to be transmitted. The MUX 307 multiplexes the data to be transmitted inputted from the input terminal 306 and control signals from the controller 304. The transmitting signal processing section 308 processes the data multiplexed at the MUX 307.

The controller 304 cyclically measures a broadcast channel transmitted from the base station 10, based on the signal form the received signal processing section 303, and processes the information of the measured result for transmitting to the base station controlling apparatus 63. And the controller 304 measures the reception quality based on the signal from the received signal processing section 303, and generates transmission power control signals for one or plural base stations 10, 11, 20, and 21. The controller 304 controls the transmission power based on the received control signals from one or plural base stations 10, 11, 20, and 21.

The controller for changing over to different frequency 421 in the mobile communication terminal 42 cyclically measures the broadcast channel transmitted from the base station 10, and judges the control of changing over to the different frequency and the control of measuring the different frequency, based on the measured results.

The control operation at the tenth embodiment is almost equal to that at the fourth embodiment. The main operation at the tenth embodiment of the present invention is executed at the controller for changing over to different frequency 421 in the mobile communication terminal 42.

At the fourth embodiment of the present invention, the control of the measurement of the different frequency is executed by measured results of the transmission power of the individual channel at the downstream channel. However, at the tenth embodiment of the present invention, the control of the measurement of the different frequency is executed by measured results of the transmission power of the individual channel at the upstream channel.

In order to achieve this, the base station controlling apparatus 63 is used at the tenth embodiment instead of the base station controlling apparatus 61 at the fourth embodiment, and the mobile communication terminal 42 is used at the tenth embodiment instead of the mobile communication terminal 40 at the fourth embodiment. And the controller for changing over to different frequency 421 is used at the tenth embodiment instead of the controller for changing over to different frequency 401 at the fourth embodiment. The operation at the tenth embodiment is almost equal to that at the fourth embodiment, however, the measured results of the transmission power of the individual channel at the upstream channel are used instead of at the downstream channel.

Therefore, at the tenth embodiment of the present invention, the probability, which achieves the changing over to the different frequency before the call drop occurs, can be made to be high at the small ratio of the data vacant time. Consequently, at the tenth embodiment of the present invention, the deterioration of the channel quality and the probability generating the call drop phenomenon, caused by the imperfection of the control of the changing over to the different frequency, can be made to be small, and the channel quality can be made to be higher.

Next, an eleventh embodiment of the present invention is explained. The structures of the base station controlling apparatus and the mobile communication terminals at the eleventh embodiment are the same at the tenth embodiment.

At the fifth embodiment of the present invention, the control of the measurement of the different frequency is executed by measured results of the transmission power of the individual channel at the downstream channel. However, at the eleventh embodiment of the present invention, the control of the measurement of the different frequency is executed by measured results of the transmission power of the individual channel at the upstream channel.

In order to achieve this, the base station controlling apparatus 63 is used at the eleventh embodiment instead of the base station controlling apparatus 61 at the fifth embodiment, and the mobile communication terminal 42 is used at the eleventh embodiment instead of the mobile communication terminal 40 at the fifth embodiment. And the controller for changing over to different frequency 421 is used at the eleventh embodiment instead of the controller for changing over to different frequency 401 at the fifth embodiment. The operation at the eleventh embodiment is almost equal to that at the fifth embodiment, however, the measured results of the transmission power of the individual channel at the upstream channel are used instead of at the downstream channel.

Therefore, at the eleventh embodiment of the present invention, the probability, which achieves the changing over to the different frequency before the call drop occurs, can be made to be high at the small ratio of the data vacant time. Consequently, at the eleventh embodiment of the present invention, the deterioration of the channel quality and the probability generating the call drop phenomenon, caused by the imperfection of the control of the changing over to the different frequency, can be made to be small, and the channel quality can be made to be higher.

Next, a twelfth embodiment of the present invention is explained. The structures of the base station controlling apparatus and the mobile communication terminals at the twelfth embodiment are the same at the tenth embodiment.

At the sixth embodiment of the present invention, the control of the measurement of the different frequency is executed by measured results of the transmission power of the individual channel at the downstream channel. However, at the twelfth embodiment of the present invention, the control of the measurement of the different frequency is executed by measured results of the transmission power of the individual channel at the upstream channel.

In order to achieve this, the base station controlling apparatus 63 is used at the twelfth embodiment instead of the base station controlling apparatus 61 at the sixth embodiment, and the mobile communication terminal 42 is used at the twelfth embodiment instead of the mobile communication terminal 40 at the sixth embodiment. And the controller for changing over to different frequency 421 is used at the twelfth embodiment instead of the controller for changing over to different frequency 401 at the sixth embodiment. The operation at the twelfth embodiment is almost equal to that at the sixth embodiment, however, the measured results of the transmission power of the individual channel at the upstream channel are used instead of at the downstream channel.

Therefore, at the twelfth embodiment of the present invention, the probability, which achieves the changing over to the different frequency before the call drop occurs, can be made to be high at the small ratio of the data vacant time. Consequently, at the twelfth embodiment of the present invention, the deterioration of the channel quality and the probability generating the call drop phenomenon, caused by the imperfection of the control of the changing over to the different frequency, can be made to be small, and the channel quality can be made to be higher.

As mentioned above, according to the embodiments of the present invention, a cellular phone system, which provides a mobile communication terminal, a first base station that communicates with the mobile communication terminal by using a first frequency, and a second base station that communicates with the mobile communication terminal by using a second frequency, is provided. And at the cellular phone system, the reception quality of the second frequency is measured corresponding to the change of the channel quality while the mobile communication terminal is communicating with the first base station by using. the first frequency. And at the cellular phone system, the channel is changed over to a channel connecting to the second base station based on the measured reception quality, and the communication is executed by using the changed over channel. At this cellular phone system, in case that the channel quality is within a predetermined first range, when the change of the channel quality is larger than a predetermined value, the reception quality of the second frequency at the mobile communication terminal is measured. And in case that the channel quality is without the predetermined first range, the reception quality of the second frequency at the mobile communication terminal is measured in more frequent times. With the operation mentioned above, the deterioration of the channel quality and the probability generating the call drop phenomenon, caused by the imperfection of the control of the changing over to the different frequency, can be made to be small, and the channel quality can be made to be higher.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A cellular phone system, comprising:
   a mobile communication terminal;
   a first base station that communicates with said mobile communication terminal by using a first frequency; and
   a second base station that communicates with said mobile communication terminal by using a second frequency, wherein:
   while said mobile communication terminal is communicating with said first base station by using a channel, the reception quality of said second frequency is measured corresponding to the change of the quality of said channel, and
   said channel is changed over to said second base station corresponding to said measured reception quality and the change of the quality of said channel, wherein:
   said cellular phone system, further comprising:
   a first reception quality measuring means that measures the reception quality of said second frequency at said mobile communication terminal in case that the quality of said channel is within a predetermined first range and when the change of the quality of said channel is larger than a designated value; and
   a second reception quality measuring means that measures more frequently the reception quality of said second frequency at said mobile communication terminal in case that the quality of said channel is without said predetermined first range, compared with the case that the quality of said channel is within said predetermined first range.

2. A cellular phone system in accordance with claim 1, wherein:
said first base station transmits a broadcast channel, and the quality of said channel is the reception quality of said broadcast channel at said mobile communication terminal.

3. A cellular phone system in accordance with claim 1, wherein:
said first base station controls the transmission power of said channel corresponding to said reception quality of said channel at said mobile communication terminal, and
the quality of said channel is the size of said transmission power.

4. A cellular phone system in accordance with claim 1, wherein:
said mobile communication terminal controls the transmission power of said channel at said first base station corresponding to the reception quality of said channel, and
the quality of said channel is the size of said transmission power.

5. A cellular phone system in accordance with claim 1, wherein:
in case that the quality of said channel is without said predetermined first range, regardless of the size of the change of the quality of said channel, the reception quality of said second frequency is measured at said mobile communication terminal.

6. A cellular phone system in accordance with claim 1, wherein:
said first base station transmits data by compressing said data in the time and also makes a data vacant time in which data is not transmitted, and
said mobile communication terminal measures said reception quality of said second frequency in said data vacant time.

7. A mobile communication terminal, which communicates with a first base station by using a first frequency and communicates with a second base station by using a second frequency and measures the reception quality of said second frequency corresponding to the change of the quality of a channel while communication is executing with said first base station by using said channel, and which changes over said channel to said second base station corresponding to said measured reception quality and the change of the quality of said channel, comprising:
a first reception quality measuring means that measures the reception quality of said second frequency in case that the quality of said channel is within a predetermined first range and when the change of the quality of said channel is larger than a designated value; and
a second reception quality measuring means that measures more frequently the reception quality of said second frequency in case that the quality of said channel is without said predetermined first range, compared with the case that the quality of said channel is within said predetermined first range.

8. A mobile communication terminal in accordance with claim 7, wherein:
the quality of said channel is the reception quality of a broadcast channel transmitting from said first base station.

9. A mobile communication terminal in accordance with claim 7, wherein:
the quality of said channel is the size of the transmission power of said channel that is controlled at said first base station corresponding to said reception quality of said channel at its own mobile communication terminal.

10. A mobile communication terminal in accordance with claim 7, wherein:
the quality of said channel is the size of the transmission power of said channel that is controlled at its own mobile communication terminal corresponding to said reception quality at said first base station.

11. A mobile communication terminal in accordance with claim 7, wherein:
in case that the quality of said channel is without said predetermined first range, regardless of the size of the change of the quality of said channel, the reception quality of said second at its own mobile communication terminal frequency is measured.

12. A mobile communication terminal in accordance with claim 7, wherein:
said reception quality of said second frequency is measured in a data vacant time, which is made by said first base station by compressing transmitting data in the time and is a time in which data is not transmitted.

13. A base station controlling apparatus in a cellular phone system, wherein:
said cellular phone system provides,
a mobile communication terminal,
a first base station that communicates with said mobile communication terminal by using a first frequency, and
a second base station that communicates with said mobile communication terminal by using a second frequency, and
while said mobile communication terminal is communicating with said first base station by using a channel, the reception quality of said second frequency is measured corresponding to the change of the quality of said channel, and
said channel is changed over to said second base station corresponding to said measured reception quality and the change of the quality of said channel, wherein:
said base station controlling apparatus controls said first and second base stations, and
said base station controlling apparatus, comprising:
a reception quality measuring means that measures the reception quality of said second frequency at said mobile communication terminal in case that the quality of said channel is within a predetermined first range and when the change of the quality of said channel is larger than a designated value; and
an instructing means that instructs one of said first and second base stations and said mobile communication terminal to measure more frequently the reception quality of said second frequency at said mobile communication terminal in case that the quality of said channel is without said predetermined first range, compared with the case that the quality of said channel is within said predetermined first range.

14. A base station controlling apparatus in accordance with claim 13, wherein:
said first base station transmits a broadcast channel, and the quality of said channel is the reception quality of said broadcast channel at said mobile communication terminal.

15. A base station controlling apparatus in accordance with claim 13, wherein:
said first base station controls the transmission power of said channel corresponding to said reception quality of said channel at said mobile communication terminal, and the quality of said channel is the size of said transmission power.

16. A base station controlling apparatus in accordance with claim 13, wherein:
said mobile communication terminal controls the transmission power of said channel at said first base station corresponding to the reception quality of said channel, and
the quality of said channel is the size of said transmission power.

17. A base station controlling apparatus in accordance with claim 13, wherein:
in case that the quality of said channel is without said predetermined first range, regardless of the size of the change of the quality of said channel, the reception quality of said second frequency is measured at said mobile communication terminal.

18. A base station controlling apparatus in accordance with claim 13, wherein:
said first base station transmits data by compressing said data in the time and also makes a data vacant time in which data is not transmitted, and
said mobile communication terminal measures said reception quality of said second frequency in said data vacant time.

19. A method changing over to a different frequency in a cellular phone system, wherein:
said cellular phone system provides,
a mobile communication terminal,
a first base station that communicates with said mobile communication terminal by using a first frequency, and
a second base station that communicates with said mobile communication terminal by using a second frequency, wherein:
said method changing over to a different frequency provides the steps of:
while said mobile communication terminal is communicating with said first base station by using a channel, measuring the reception quality of said second frequency corresponding to the change of the quality of said channel, and
executing communication by changing over said channel to said second base station corresponding to said measured reception quality and the change of the quality of said channel, wherein:
said method changing over to a different frequency, further comprising the steps of:
measuring the reception quality of said second frequency at said mobile communication terminal in case that the quality of said channel is within a predetermined first range and when the change of the quality of said channel is larger than a designated value; and
measuring more frequently the reception quality of said second frequency at said mobile communication terminal in case that the quality of said channel is without said predetermined first range, compared with the case that the quality of said channel is within said predetermined first range.

20. A method changing over to a different frequency in accordance with claim 19, wherein:
said first base station transmits a broadcast channel, and the quality of said channel is the reception quality of said broadcast channel at said mobile communication terminal.

21. A method changing over to a different frequency in accordance with claim 19, wherein:
said first base station controls the transmission power of said channel corresponding to said reception quality of said channel at said mobile communication terminal, and
the quality of said channel is the size of said transmission power.

22. A method changing over to a different frequency in accordance with claim 19, wherein:
said mobile communication terminal controls the transmission power of said channel at said first base station corresponding to the reception quality of said channel, and
the quality of said channel is the size of said transmission power.

23. A method changing over to a different frequency in accordance with claim 19, wherein:
in case that the quality of said channel is without said predetermined first range, regardless of the size of the change of the quality of said channel, the reception quality of said second frequency is measured at said mobile communication terminal.

24. A method changing over to a different frequency in accordance with claim 19, wherein:
said first base station transmits data by compressing said data in the time and also makes a data vacant time in which data is not transmitted, and
said mobile communication terminal measures said reception quality of said second frequency in said data vacant time.

* * * * *